US009419685B2

United States Patent
Kitani

(10) Patent No.: US 9,419,685 B2
(45) Date of Patent: Aug. 16, 2016

(54) TRANSMITTER, RECEIVER, NON-CONTACT POWER TRANSMISSION CONTROL METHOD, AND COMPUTER-READABLE RECORDING MEDIUM

(75) Inventor: Mitsuhiro Kitani, Tokyo (JP)

(73) Assignee: NEC Corporation, Tokyo (JP)

( * ) Notice: Subject to any disclaimer, the term of this patent is extended or adjusted under 35 U.S.C. 154(b) by 492 days.

(21) Appl. No.: 14/111,822

(22) PCT Filed: Apr. 12, 2012

(86) PCT No.: PCT/JP2012/059991
§ 371 (c)(1),
(2), (4) Date: Oct. 15, 2013

(87) PCT Pub. No.: WO2012/141239
PCT Pub. Date: Oct. 18, 2012

(65) Prior Publication Data
US 2014/0035391 A1    Feb. 6, 2014

(30) Foreign Application Priority Data
Apr. 15, 2011    (JP) ................. 2011-090692

(51) Int. Cl.
*H01F 27/42* (2006.01)
*H04B 5/00* (2006.01)
*H02J 5/00* (2016.01)
*H02J 7/02* (2016.01)

(52) U.S. Cl.
CPC ............. *H04B 5/0037* (2013.01); *H02J 5/005* (2013.01); *H02J 7/025* (2013.01)

(58) Field of Classification Search
CPC ......... H02J 5/005; H02J 7/025; H04B 5/0037
USPC ....................................................... 307/104
See application file for complete search history.

(56) References Cited

U.S. PATENT DOCUMENTS 4,297,701 A * 10/1981 Henriques ............. A63B 57/00
342/125
2008/0197713 A1* 8/2008 Jin ........................ H02J 7/025
307/104

(Continued)

FOREIGN PATENT DOCUMENTS

JP    2001-275280    10/2001
JP    2002-027020    1/2002

(Continued)

OTHER PUBLICATIONS

International Search Report of PCT/JP2012/059991 mailed Jun. 26, 2012 (2 pages).

(Continued)

*Primary Examiner* — Jared Fureman
*Assistant Examiner* — Duc M Pham
(74) *Attorney, Agent, or Firm* — Wilmer Cutler Pickering Hale and Dorr LLP

(57) ABSTRACT

A power transmitting device includes a power transmitter (21) transmitting electric power in a contactless manner, a data communicator (22) obtaining identification information of at least one power receiving device that has become possible to receive electric power transmitted from the power transmitter (21), a power receiving device finding/separation detector (261) counting a number of state switchings between a power unreceivable state and the power receivable state during a predetermined period of time, for each power receiving device of which identification information has been obtained, and a power transmission controller (263) controlling electric power transmission performed by the power transmitter (21), on the basis of the number of state switchings counted by the power receiving device finding/separation detector (261).

10 Claims, 11 Drawing Sheets

(56) References Cited

U.S. PATENT DOCUMENTS

| | | | |
|---|---|---|---|
| 2010/0145568 A1* | 6/2010 | Watanabe | G07C 5/085 701/29.6 |
| 2011/0092212 A1* | 4/2011 | Kubota | H04W 52/0225 455/436 |

FOREIGN PATENT DOCUMENTS

| | | |
|---|---|---|
| JP | 2003-319573 | 11/2003 |
| JP | 2006-060909 | 3/2006 |
| JP | 2007-134756 | 5/2007 |
| JP | 2010-063245 | 3/2010 |
| WO | WO-2009050624 A2 | 4/2009 |
| WO | WO-2010055381 A1 | 5/2010 |

OTHER PUBLICATIONS

Extended European Search Report issued by the European Patent Office for European Application No. 12770858.4 dated Sep. 17, 2014 (5 pgs.).

* cited by examiner

TRANSMITTER, RECEIVER, NON-CONTACT POWER TRANSMISSION CONTROL METHOD, AND COMPUTER-READABLE RECORDING MEDIUM

CROSS-REFERENCE TO RELATED APPLICATIONS

This application is a national stage application of International Application No. PCT/JP2012/059991 entitled "Transmitter, Receiver, Non-Contact Power Transmission Control Method, and Computer-Readable Recording Medium," filed on Apr. 12, 2012, which claims the benefit of the priority of Japanese patent application No. 2011-090692, filed on Apr. 15, 2011, the disclosures of each of which are hereby incorporated by reference in their entirety.

TECHNICAL FIELD

The present invention relates to a power transmitting device, a power receiving device, a contactless power transmission controlling method, and a computer readable recording medium that perform electric power transmission in a contactless manner.

BACKGROUND ART

There is known a technique relating to contactless electric power transmission (no-contact-point electric power transmission) that enables electric power transmission by using electromagnetic induction or the like even when no contact points exist.

For example, Patent Literature 1 relates to a technique that uses electromagnetic induction for charging a portable terminal such as a cellular phone in a contactless manner. Patent Literature 1 describes contactless electric power transmission between a power transmitting device comprising a primary coil and a power receiving device comprising a secondary coil. In the contactless electric power transmission using electromagnetic induction, a transmission distance of electric power is limited to a distance within the range of several millimeters, and position matching between the coils needs to be precisely performed to maintain the transmission efficiency.

Meanwhile, a contactless electric power transmitting method using a magnetic resonance phenomenon (called magnetic resonance method in the following) as described in Patent Literature 2 has been receiving much attention lately. The magnetic resonance method has an advantage in that the power transmission efficiency is not reduced compared with the case of the electromagnetic induction, even when a distance between a primary coil and a secondary coil, and a positional deviation between the coils become large compared with the case of the electromagnetic induction. For this reason, theoretically, one charge stand (power transmitting device) comprising one primary coil can simultaneously transmit electric power to a plurality of portable terminals (power receiving devices) each comprising the secondary coil.

CITATION LIST

Patent Literature

Patent Literature 1: Unexamined Japanese Patent Application Kokai Publication No. 2006-60909.

Patent Literature 2: Unexamined Japanese Patent Application Kokai Publication No. 2010-63245.

SUMMARY OF INVENTION

Technical Problem

In the contactless electric power transmitting systems as described in Patent Literature 1 and 2, and the like, as larger electric power is made possible to be transmitted to a power receiving device at a more distant position, the convenience is more enhanced, and the application is further broadened.

However, at the time of transmitting electric power in a contactless manner (wireless manner), unlike a case of transmitting electric power via a cable in a wired manner, a state concerning electric power transmission between the power transmitting device and the power receiving device is not always constant, and a power transmitting state varies due to a positional relation (distance) between the power transmitting device and the power receiving device, and due to existence of an obstacle or the like between the power transmitting device and the power receiving device. This variation of the power transmitting state causes a situation in which a state of whether the power receiving device is recognized or not is repeatedly switched in a short time, or causes a situation in which a state of whether electric power from the power transmitting device is received or not is repeatedly switched in a short time. The former state is determined by the power transmitting device, and the latter state is determined by the power receiving device.

In such a case, the following problems occur. Information that is respectively managed at the power transmitting device and the power receiving device and that represents an electric power transmitting state differs between the power transmitting device and the power receiving device. Power transmitting control in the power transmitting device does not match with an actual power transmitting state. Power receiving control in the power receiving device does not match with an actual power receiving state. For this reason, these problems are desired to be solved at the time of the contactless electric power transmission.

In view of the above-described circumstances, the present invention was made. An object of the present invention is to provide a power transmitting device, a power receiving device, a contactless power transmission controlling method, and a computer readable recording medium that enable stable electric power transmission in which information representing electric power transmitting control matches with an actual state of electric power transmission.

Solution to Problem

In order to accomplish the above-described object, a power transmitting device according to a first aspect of the present invention comprises:

a power transmitter that transmits electric power in a contactless manner;

a data communicator that obtains identification information of one or more power receiving devices that have become possible to receive electric power transmitted from the power transmitter;

a state switching number counter that counts a number of state switching between a power unreceivable state and a power receivable state during a predetermined period of time, for each power receiving device of which the identification information has been obtained; and a power transmission controller that controls electric power transmission performed by the power transmitter, on the basis of the number of state switchings, the number of state switchings being counted by the state switching number counter.

A power receiving device according to a second aspect of the present invention comprises:

a power receiver that receives electric power transmitted from a power transmitting device in a contactless manner;

a data communicator that obtains identification information of one or more power transmitting devices from the power transmitting device that transmits the electric power, wherein the power receiver has become possible to receive the electric power;

a state switching number counter that counts a number of state switchings of a power receiving state between a power unreceivable state and a power receivable state during a predetermined period of time, wherein the power receiving state concerns electric power transmission from the power transmitting device of which identification information has been obtained; and a power reception controller that controls electric power reception performed by the power receiver, on the basis of the number of state switchings, the number of state switchings being counted by the state switching number counter.

A contactless power transmission controlling method according to a third aspect of the present invention is a contactless power transmission controlling method for electric power transmission from a power transmitting device to a power receiving device in a contactless manner, the method being performed in at least either the power transmitting device or the power receiving device, and comprising:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which identification information has been obtained; and a controlling step that controls the electric power transmission on the basis of the number of state switchings, the number of state switchings being counted at the state switching number counting step.

A computer readable non-transitory recording medium according to a fourth aspect of the present invention stores a program causing a computer, to execute, that controls a power transmitting device in a contactless electric power transmitting system, in which the power transmitting device transmits electric power to a power receiving device:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which the identification information has been obtained; and a controlling step that controls the electric power transmission on the basis of the number of state switchings, the number of state switchings being counted at the number of state switchings counting step.

A computer readable recording medium according to a fifth aspect of the present invention stores a program causing a computer, to execute, that controls a power receiving device in a contactless electric power transmitting system in which a power transmitting device transmits electric power to the power receiving device:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which the identification information has been obtained; and a controlling step that controls the electric power transmission on the basis of the number of state switchings, the number of state switchings being counted at the state switching number counting step.

Advantageous Effects of Invention

According to the present invention, stable electric power transmission is performed such that information representing electric power transmitting control matches with an actual state of electric power transmission.

DESCRIPTION OF EMBODIMENTS

Embodiment 1

In the following, an embodiment 1 of the present invention is described in detail with reference to FIGS. 1, 2, 4, 5, and 6.

Figure 1:
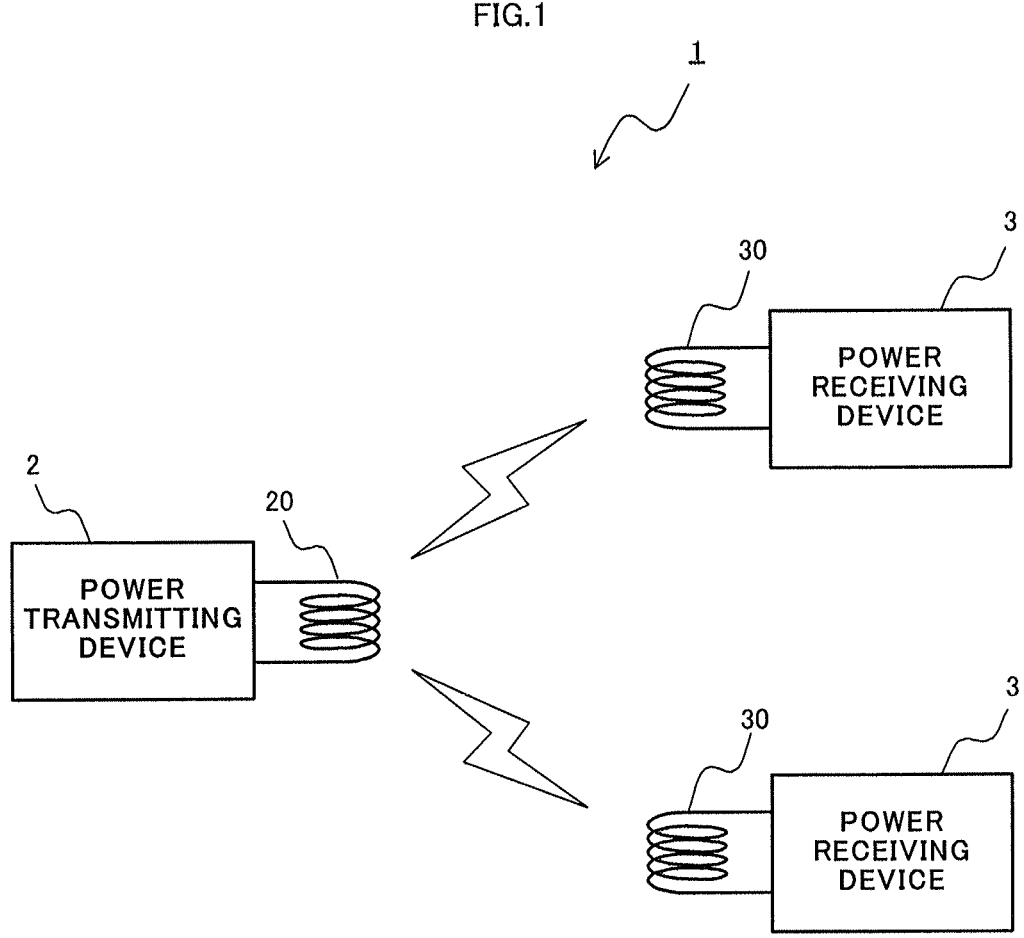
FIG. 1 is a block diagram illustrating a configuration of a contactless electric power transmitting system according to an embodiment 1 of the present invention.

A contactless electric power transmitting system 1 according to the present embodiment comprises a power transmitting device 2 and a power receiving device 3, as illustrated in FIG. 1. The power transmitting device 2 comprises a primary coil 20, and the power receiving device 3 comprises a secondary coil 30. In FIG. 1, the two power receiving devices 3 are illustrated. The number of the power receiving devices 3 that receive electric power transmitted from the power transmitting device 2 is arbitrary.

The present system 1 does not limit an electric power transmitting method. The present system 1 is applied to the electromagnetic induction method and the magnetic resonance method described above in the Background Art, and is applied to any method such as an electric field resonance method and a radio emission method that are other contactless electric power transmitting methods.

Figure 2:
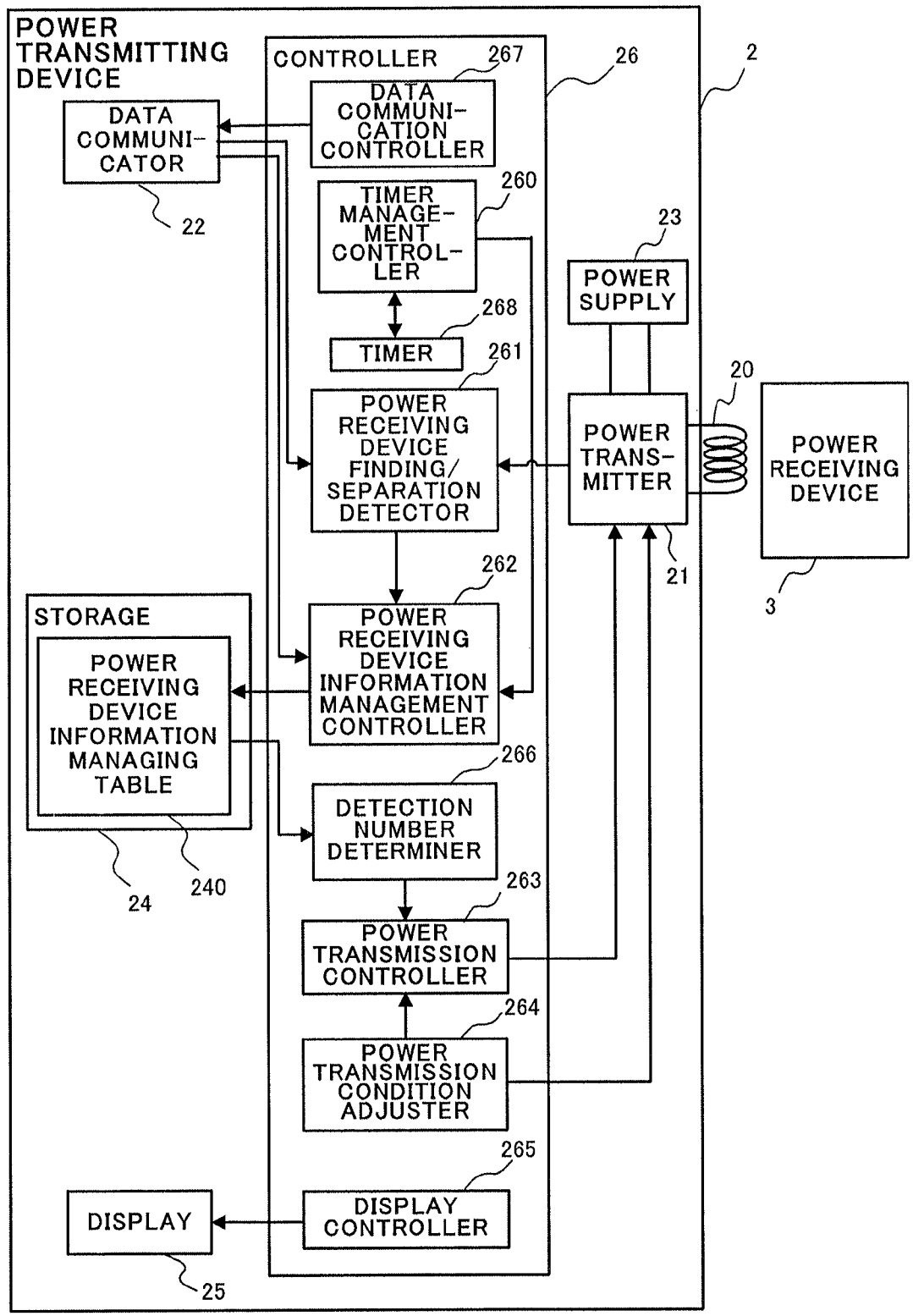
FIG. 2 is a function block diagram for describing a function of a power transmitting device according to the embodiment 1.

An internal configuration of the transmitting device 2 is described in detail with reference to FIG. 2. The transmitting device 2 is a charging device installed indoors.

The transmitting device 2 possesses a function of transmitting electric power to the power receiving device 3 via the primary coil 20 in a contactless manner.

The transmitting device 2 comprises a power transmitter 21 including the primary coil 20, a data communicator 22 an electric power supply 23, a storage 24, a display 25, and a controller 26.

The power transmitter 21 comprises a resonance circuit, an oscillation circuit, and a matching circuit (not illustrated in the drawing).

The resonance circuit mainly comprises the primary coil 20 and a capacitor. A resonant frequency of the resonance circuit is determined by an inductance L of the primary coil and an electrostatic capacitance C of the capacitor. In another example, the resonance circuit is configured to comprise a coil other than the primary coil 20.

The matching circuit comprises a variable coil or a variable capacitor. The matching circuit is a circuit adjusting an inductance L or an electrostatic capacitance C of the entire power transmitter 21 on the basis of information of a resonant frequency that is calculated by the a power transmission condition adjuster 264 (described later) of the controller 26 in accordance with a positional relation (distance) between the power transmitting device 2 and the power receiving device 3 such that a power transmission efficiency becomes maximum.

The oscillation circuit inverts a direct current (DC) voltage input from the electric power supply 23, into an alternating current (AC) voltage with the resonant frequency determined by the resonance circuit and the matching circuit. In other words, the oscillation circuit oscillates the primary coil 20 by an AC voltage of the resonant frequency.

The data communicator 22 possesses a wireless communication function. The data communicator 22 performs transmission and reception of data such as a control command for performing electric power transmitting control with the power receiving device 3. The transmission and the reception of the data is performed by one-way communication or two-way communication. The data communicator 22 transmits the data to the power receiving device 3, and receives the data from the power receiving device 3. In one example, as described later, the data communicator 22 obtains identification information for specifying the power receiving device 3, so that the data communicator 22 functions as an identification information obtainer 22.

The electric power supply 23 is a DC power source that supplies electric power for contactless power transmission by the power transmitter 21.

The storage 24 is constituted by a nonvolatile semiconductor memory such as a read only memory (ROM) and a flash memory, or a volatile semiconductor memory such as a random access memory (RAM). The storage 24 stores a program controlling the power transmitting device 2, and stores data.

The storage 24 stores a power receiving device information managing table 240 for managing information concerning the power receiving device 3 detected by the power transmitting device 2.

Figure 6:
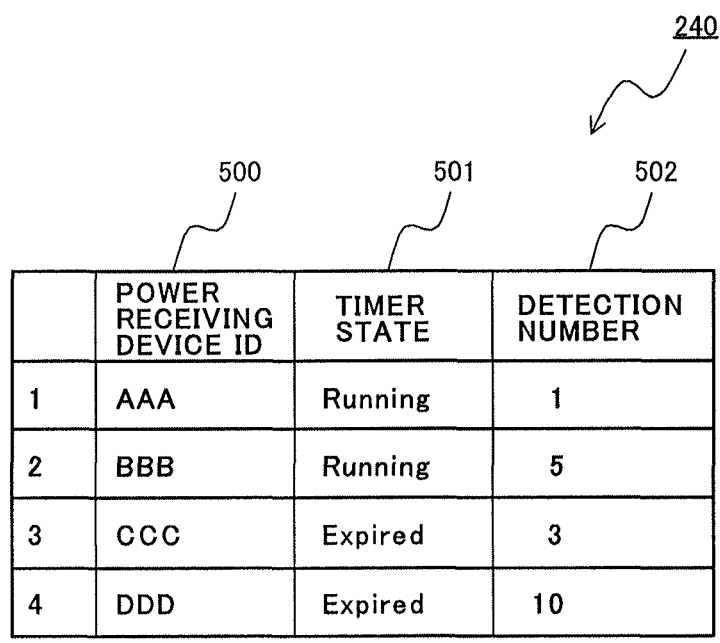
FIG. 6 illustrates a power receiving device information managing table according to the embodiment 1.

The power receiving device information managing table 240 indicates the relation among a power receiving device ID 500, a timer state 501, and the detection number 502, as illustrated in FIG. 6. The power receiving device ID 500 indicates the identification information for specifying the power receiving device 3 detected by the power transmitting device 2. The timer state 501 is information representing a state of a timer that is managed by the power transmitting device 2 for each power receiving device ID 500. The timer is activated when the power transmitting device 2 detects the power receiving device 3 for the first time. The detection number 502 is information representing the number of times the power transmitting device 2 detects the power receiving device 3 of each power receiving device ID 500.

The power receiving device information managing table 240 enables management of the number-of-times information that represents how many times repeat operation of recognition and non-recognition of the power receiving device 3 is performed during a predetermined period of time while the power transmitting device 2 is transmitting electric power after the power transmitting device 2 detects the power receiving device 3.

The display 25 informs a user of information about a present charge state. For example, it is considered that the display 25 displays the charge state by lighting or flashing of an LED. In another example, a liquid crystal panel or an organic electroluminescence panel is used to display a character string or an image to thereby display the charge state. In still another example, information indicating the charge state is provided to a user in a different method.

The controller 26 comprises a timer management controller 260, a power receiving device finding/separation detector 261, a power receiving device information management controller 262, a power transmission controller 263, a power transmission condition adjuster 264, a display controller 265, a detection number determiner 266, a data communication controller 267, and a timer 268.

The timer management controller 260 performs control and management of the timer 268.

The power receiving device finding/separation detector 261 detects that the power receiving device 3 approaches the power transmitting device 2 within a range where it is possible for the power receiving device 3 to receive electric power. The power receiving device finding/separation detector 261 detects that the power receiving device 3 is separated from the range where it is possible for the power receiving device 3 to receive electric power. The power receiving device finding/separation detector 261 determines whether or not there is the power receiving device 3 that has approached the power receivable range. In other words, the power receiving device finding/separation detector 261 determines whether or not there is the power receiving device 3 of which state has been switched from a non-recognized state to a recognized state. A result of this determination is output as the detection of the power receiving device 3 to the power receiving device information management controller 262. As a concrete detecting method, the following methods are considered, for example. In the first method, approach and separation of the secondary coil 30 of the power receiving device 3, for example, causes a magnetic field to change, and an inductance varying in accordance with this change of the magnetic field is detected to detect approach and separation of the device. In the second method, the data communication controller 267 (described later) performs, with the power receiving device 3, transmission and reception of a control command for the electric power transmitting control, and on the basis of the received information, approach and separation of the power receiving device 3 is detected. A method of detecting the power receiving device 3 is not limited to the above-described methods. In another example, approach and separation of the power receiving device 3 is detected in a different method. The power receiving device finding/separation detector 261 counts the number of times a state is switched between the power unreceivable state and the power receivable state. Accordingly, the power receiving device finding/separation detector 261 can also be called a state switching number counter (261).

The power receiving device information management controller 262 performs addition, update, and management of the power receiving device information managing table 240 stored in the storage 24, on the basis of the information received by the data communicator 22 from the power receiving device 3, and the detection result of the power receiving device 3 from the power receiving device finding/separation detector 261.

The power transmission controller 263 possesses a function of controlling the oscillation circuit of the power transmitter 21, on the basis of the output of the power transmission condition adjuster 264 described later, and the determination result of the detection number determiner 266. The power transmission controller 263 turns on and off the electric power transmission, and adjusts transmission electric power.

The power transmission condition adjuster 264 derives a transmission condition such as a resonant frequency and transmission electric power, outputs a signal indicating the resonant frequency, to the power transmitter 21, and outputs a signal indicating the transmission electric power, to the power transmission controller 263. The matching circuit of the power transmitter 21 adjusts an inductance L and an electrostatic capacitance C on the basis of the information of the input resonant frequency.

The display controller 265 possesses a function of controlling the display 25, and performs display control of displaying the charge situation and the like.

The detection number determiner 266 receives a result to read out, the result indicating that the timer 268 has completed the count of the predetermined period, the detection number of the power receiving device 3 from the storage 24. This detection number is held in the power receiving device information managing table 240. Then, the detection number determiner 266 determines whether or not the detection number during the predetermined period of time is equal to or larger than the specified number (N number) of times, and outputs a result of the determination to the power transmission controller 263. The detection number determiner 266 makes the determination concerning the number of state switchings between the state where the power receiving device 3 is not detected, that is, the power unreceivable state and the state where the power receiving device 3 is detected, that is, the power receivable state. Accordingly, the detection number determiner 266 can also be called a state switching number determiner 266.

The data communication controller 267 performs data communication control of the data communicator 22.

Next, operation of an electric power transmitting function by the contactless electric power, transmitting system 1 configured as above is described with reference with FIGS. 2, 4, and 5.

When the electric power supply 23 of the power transmitting device 2 is turned on, the power receiving device finding/separation detector 261 of the controller 26 monitors approach of the power receiving device 3. When the power receiving device finding/separation detector 261 detects that the power receiving device 3 is positioned within the range where it is possible for the power receiving device 3 to receive electric power transmitted from the power transmitting device 2, the oscillation circuit of the power transmitter 21 oscillates at the resonant frequency to start the electric power transmission to the power receiving device 3. Then, the controller 26 outputs a control signal to control the electric power transmission by the power transmitter 21. At this time, the data communicator 22 performs, with a data communicator 32 of the detected power receiving device 3, transmission and reception of data such as a control command for the electric power transmission control. The storage 24 stores information that concerns the power receiving device 3 and that is obtained by the controller 26 on the basis of information obtained from the power transmitter 21 and the data communicator 22.

Processes performed by the controller 26 of the power transmitting device 2 are described in detail with reference to FIGS. 4 and 5. FIG. 4 is a flowchart showing a power receiving device information managing process, and FIG. 5 is a flowchart showing a power transmitting process. Each of these processes is started by turning on the electric power source of the power transmitting device 2. These processes are performed concurrently and independently of each other.

First, the power receiving device information managing process illustrated in FIG. 4 will be described.

At the step S400, to detect the power receiving device 3, the power receiving device finding/separation detector 261 determines whether or not there is the power receiving device 3 that has approached the power receivable range. In other words, the power receiving device finding/separation detector 261 determines whether or not there is the power receiving device 3 of which state has been switched from the non-recognized state to the recognized state. When the power receiving device finding/separation detector 261 determines the non-detection of the power receiving device 3, that is, the non-recognition (step S400; No), the process returns to the step S400 to detect the power receiving device 3 again. Meanwhile, when it is determined that the power receiving device 3 is detected, that is, the recognition is determined (step S400; Yes), the process proceeds to the step S401.

At the step S401, the power receiving device information management controller 262 obtains, via the data communication controller 267, the identification information (referred to as the power receiving device ID 500, in the following) for specifying the power receiving device 3. The power receiving device ID 500 is obtained by the data communicator 22 through data transmission and reception between the data communicator 22 and the power transmitting device 2. At the step S401, the power receiving device information management controller 262 then checks which power receiving device 3 is detected. The data communication controller 267 obtains the power receiving device ID 500 included in a control command transmitted from the power receiving device 3, to uniquely specify the power receiving device 3.

Subsequently, at the step S402, the power receiving device information management controller 262 adds or updates information concerning the detected power receiving device ID 500, in the power receiving device information managing table 240. Specifically, when the new power receiving device ID 500 is detected, the power receiving device information management controller 262 adds an information section in the power receiving device information managing table 240, corresponding to the same power receiving device ID 500. Meanwhile, when the power receiving device ID 500 of which information section already exists in the power receiving device information managing table 240 is detected, the power receiving device information management controller 262 updates the detection number 502 corresponding to the same power receiving device ID 500. In other words, count of the detection number of the power receiving device 3 is performed and managed for each power receiving device ID.

Then, at the step S403, the timer management controller 260 refers to the timer state 501 of the power receiving device information managing table 240 to determine whether or not among the timers 268 allocated to the respective detected power receiving devices 3, there is the timer 268 of which time count has reached the predetermined period of time, that is, the timer 268 that has completed the count. A plurality of the timers 268 provided in the power transmitting device 2 are allocated to the respective detected power receiving devices 3. The timer states 501 in the power receiving device information managing table 240 reflect the states of the respective timers 268. The timer state 501 indicates either the state "Expired" in which the timer 268 has completed the count, or the state "Running" in which the timer 268 has not completed the count. At the step S403, if none of the timers 268 is started yet, the same process as the case where it is determined that the timer 268 has not completed the count is performed (step S403; No).

When it is determined at the step S403 that there is the timer 268 that has completed the count (step S403; Yes), the process proceeds to the step S404. Then, the detection number determiner 266 refers to the power receiving device information managing table 240 to determine whether or not the detection number 502 corresponding to the power receiving device ID 500 of the power receiving device 3 for which the timer 268 has completed the count is equal to or larger than the specified number (N number) of times. When it is determined at the step S404 that the detection number 502 is smaller than the N number of times (step S404; No), the process proceeds to the step S405. Then, the power transmission controller 263 performs control of starting the electric power transmission, or performs control of continuing the transmission of the electric power when the electric power transmission has been already started.

Then, the power receiving device information management controller 262 deletes, from the power receiving device information managing table 240, the information corresponding to the power receiving device ID 500 of the power receiving device 3 for which the timer 268 has completed the count, to update the power receiving device information managing table 240 (step S406). In other words, when the number of times the same power receiving device 3 is detected during the predetermined period of time is smaller than the predetermined number of times, the information corresponding to the power receiving device ID 500 is deleted from the power receiving device information managing table 240 while the electric power transmission is started or continued, to indicate that the detection state is stable.

After that, when the electric power source is not in an off state (step S412; No), the process returns to the step S400 to continue the process. When the electric power source is in an off state (step S412; Yes), the power receiving device information managing process is ended.

When it is determined at the step S404 that the detection number is equal to or larger than the N number of times (step S404; Yes), the power transmission controller 263 performs control so as not to start the electric power transmission, or performs control of stopping the transmission of the electric power when the electric power transmission has been already started (step S407). Then, the above-described process of the step S406 is performed. In other words, when the number of times the same power receiving device 3 is detected during the predetermined period of time is larger than the predetermined number of times, it is estimated that the detection state is unstable. For this reason, the transmission of the electric power is stopped, and the information corresponding to the power receiving device ID 500 is deleted from the power receiving device information managing table 240 to update the power receiving device information managing table 240 (step S406). When the electric power source is not in an off state (step S412; No), the detection state is monitored again (step S400).

Meanwhile, when it is determined at the step S403 that there are no timers 268 that have completed the count, or that none of the timers 268 have started the count yet (step S403; No), the power transmission controller 263 starts the electric power transmission, or continues the electric power transmission when the transmission has been already started (step S408).

Then, the timer management controller 260 refers to the timer state 501 in the power receiving device information managing table 240 to determine whether or not the timer 268 corresponding to the detected power receiving device 3 has been already activated (step S409). The activation of the timer 268 means the start of the time count by the timer 268. When it is determined that the timer 268 is not activated (step S409; No), the timer management controller 260 activates the timer 268 (the step S410).

Next, the power receiving device information management controller 262 updates the timer state 501 corresponding to the power receiving device ID 500 of the detected power receiving device 3 (step S411). When it is determined at the step S409 that the timer 268 has been already activated (step S409; Yes), the process returns to the step S400 as long as the electric power source is not turned off (step S412; No), or the power receiving device information managing process is ended when the electric power source that continues the process is in an off state (step S412; Yes).

Next, the power transmitting process illustrated in FIG. 5 will be described.

Figure 4:
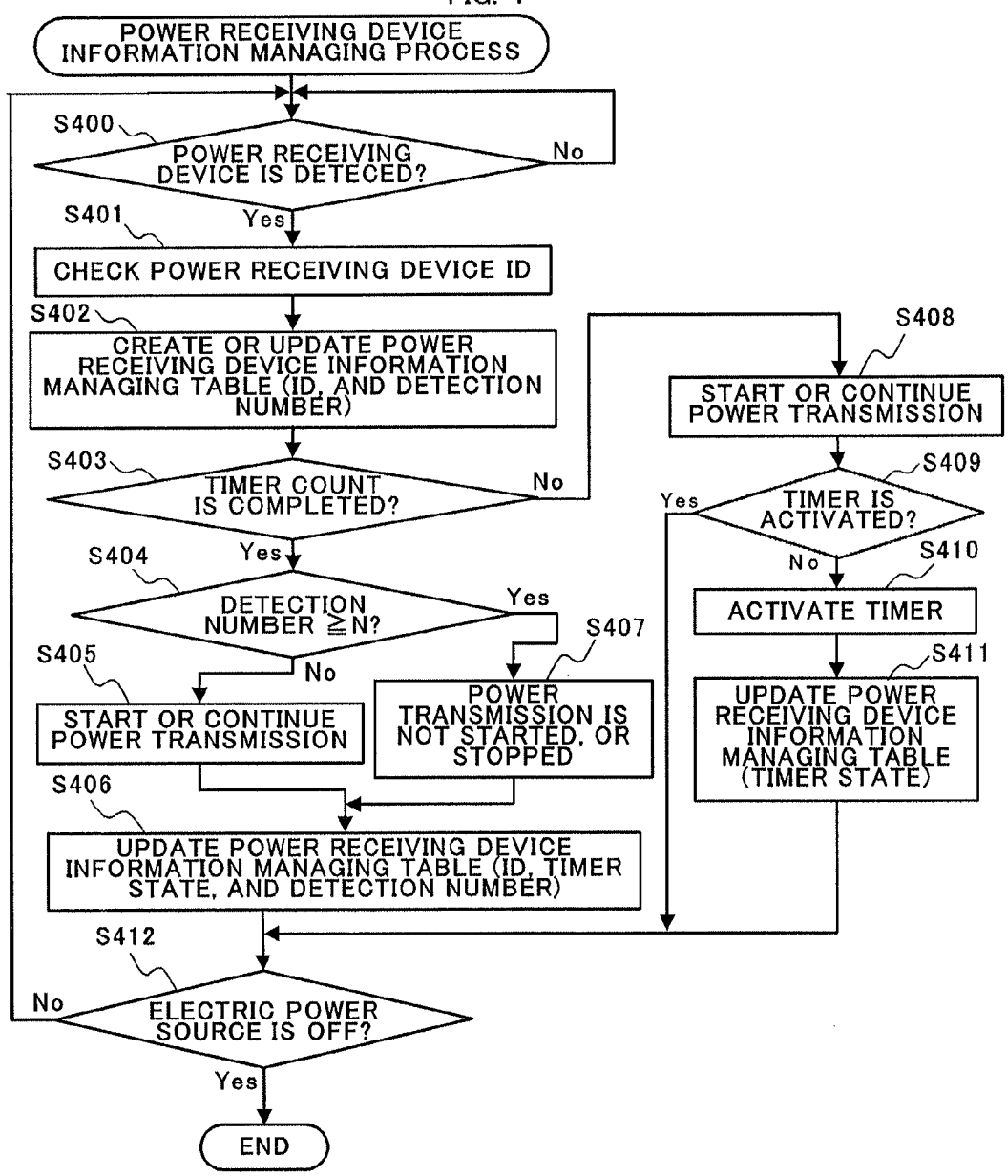
FIG. 4 is a flowchart showing a power receiving device information managing process procedure according to the embodiment 1.
Figure 5:
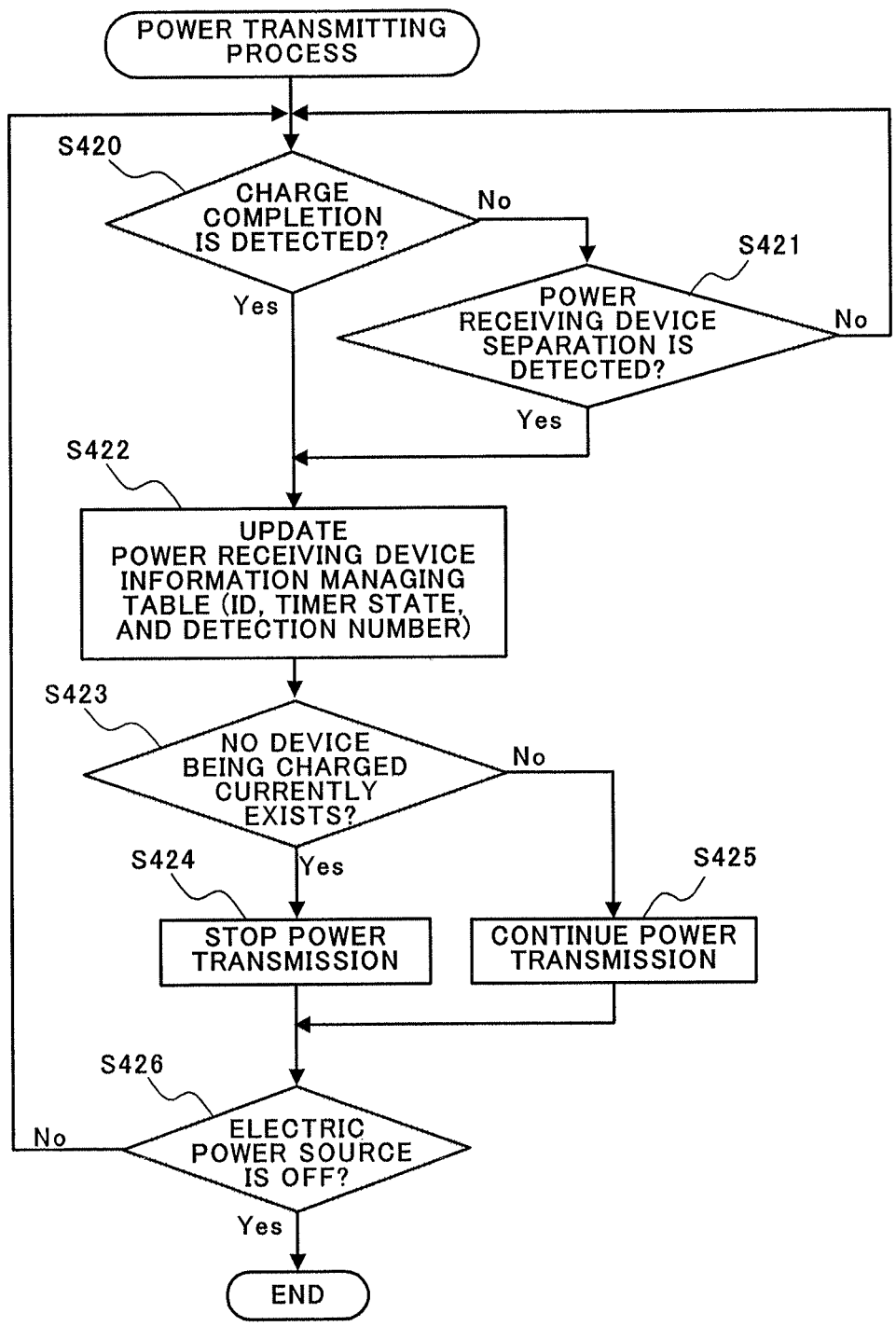
FIG. 5 is a flowchart showing a power transmitting process procedure according to the embodiment 1.

The process in FIG. 5 is performed concurrently with the process in FIG. 4 so as to be continued during the period in which the electric power source of the electric power supply 23 is in an on state.

At the step S420, the power receiving device information management controller 262 receives, via the data communication controller 267, the control command information communicated from the power receiving device 3, to determine whether or not the charge of the power receiving device 3 is completed, that is, the charge completion is detected (step S420). When the power receiving device information management controller 262 detects the charge completion of any one of the power receiving devices 3 (step S420; Yes), the process proceeds to the step S422.

Meanwhile, when the charge completion of none of the power receiving devices 3 is detected (step S420; No), the process proceeds to the step S421. At the step S421, the power receiving device finding/separation detector 261 determines whether or not the power receiving devices 3 listed in the power receiving device information managing table 240 include the separated power receiving device 3, that is, whether or not the separation of the power receiving device 3 is detected. When the separated power receiving device 3 exists (step S421; Yes), the process proceeds to the step S422. Meanwhile, when the separated power receiving device 3 does not exist (step S421; No), the process returns to the step S420.

At the step S422, the power receiving device information management controller 262 deletes, from the power receiving device information managing table 240, the information that concerns the power receiving device 3 of which charge is completed or concerns the power receiving device 3 of which separation is detected, to thereby update the power receiving device information managing table 240. Then, the process proceeds to the step S423.

At the step S423, the power receiving device information management controller 262 determines whether there is no power receiving device 3 that is being charged at present. When it is determined at the step S423 that the power receiving device 3 being charged at present exists (step S423; No), the process proceeds to the step S425. Then, the power transmission controller 263 continues the electric power transmission. After that, when the electric power source is not in an off state (step S426; No), the process returns to the step S420 to continue the process. When the electric power source is in an off state (step S426; Yes), the power receiving process is ended.

When it is determined at the step S423 that the power receiving device 3 being charged at present does not exist (step S423; Yes), the process proceeds to the step S424. Then, the power transmission controller 263 stops the electric power transmission. After that, when the electric power source is not in an off state (step S426; No), the process returns to the step S420 to continue the process. When the electric power source is in an off state (step S426; Yes), the power receiving process is ended.

As described above, according to the embodiment 1, after the power transmitting device 2 detects the power receiving device 3, until the predetermined period of time lapses, that is, until the timer 268 completes the count, the electric power transmission is continued even if the power receiving device 3 is not recognized. After the predetermined period of time lapses, that is, after the timer 268 completes the count, in the case where the number of times (that is, the detection number) the state is, during this predetermined period of time, switched from the (non-recognizable) state in which the recognition of the power receiving device 3 fails to the (recognizable) state in which the recognition of the power receiving device 3 succeeds is equal to or larger than the arbitrary specified number of times, the electric power transmission is stopped, or is not started even when the same power receiving device 3 is detected. This prevents generation of mismatch between the information of the power transmitting control in the power transmitting device 2 and the actual power transmitting state. In other words, it is possible to prevent user friendliness from being damaged by the mismatch between the actual state of the electric power transmission and the information that represents the charge state and that is provided to a user.

In one example, the power receiving device information managing process illustrated in FIG. 4 further comprises an additional process step after the step S407. At this additional process step, the display controller 265 performs one or both of control of causing the display 25 to display an error message including the contents, for example, "normal start of charge fails" or "charge is stopped", and control of outputting an audio error message for recognition by a user. In this case, in an example, control of causing the display 25 to display not only the error message but also an instruction including the contents, such as "please bring the power receiving device closer to the power transmitting device" for avoiding the error is performed, and additionally or alternatively, control of outputting an audio instruction for recognition by a user to avoid the error is performed.

In one example, the data communication controller 267 performs control of transmitting a specific command to the power receiving device 3 via the data communicator 22 to cause a display 36 provided in the power receiving device 3 to display one or both of the above-described error message and the above-described instruction for avoiding the error. The above-described process step can be added after the step S407 so that a user recognizes that charge is not normally operated, leading to further improvement in user friendliness.

In one example, at the step S407, instead of performing the power transmission stopping process, the power transmission controller 263 performs one or both of control of outputting a command for adjusting an inductance L and an electrostatic capacitance C of the matching circuit to change a resonant frequency of the resonance circuit of the power transmitter 21 via the power transmission condition adjuster 264, and control of outputting, to the power transmission controller 263, a command for increasing the electric power, for example. Performing these processes suppresses generation of the phenomenon in which recognition and non-recognition of the power receiving device 3 is repeated in the power transmitting device 2.

In one example, regarding the step S407, before the step S407, the power receiving device information management controller 262 determines whether or not another power receiving device 3 that is being charged exists, that is, whether the number of the power receiving devices 3 is only one or plural (at the step corresponding to the step S423). In this example, the power transmission controller 263 performs control such that only when another power receiving device 3 that is being charged does not exist, the power transmission is stopped, and when another power receiving device 3 that is being charged exists, the power transmission is continued. This control prevents charge of another power receiving device 3 from being affected by stopping the electric power transmission due to the specific power receiving device 3 in a usage status where a plurality of the power receiving devices are simultaneously charged.

In the embodiment 1, in one example, when the power transmitting device 2 detects some error (for example, an extremely small received electric power amount in the power receiving device 3, or failure of normal data communication with the power receiving device 3), the power transmission controller 263 performs control so as to temporarily stop the electric power transmission and then resume the electric power transmission to restart the power receiving device 3 so that a state of the power receiving device 3 is changed to an initial state.

Embodiment 2

In the following, an embodiment 2 of the present invention is described in detail with reference to FIGS. 1, 2, and 7. A configuration of the contactless electric power transmitting system 1 and an internal configuration of the power transmitting device 2 according to the embodiment 2 are the same as the embodiment 1, so the description is omitted.

The present embodiment 2 differs from the embodiment 1 in the process of the controller 26 of the power transmitting device 2. Accordingly, the contents of the power receiving device information managing process of the power controller 26 are described in detail by a flowchart in FIG. 7. The power transmitting process of the present embodiment 2 is the same as the embodiment 1, so the description is omitted.

Figure 7:
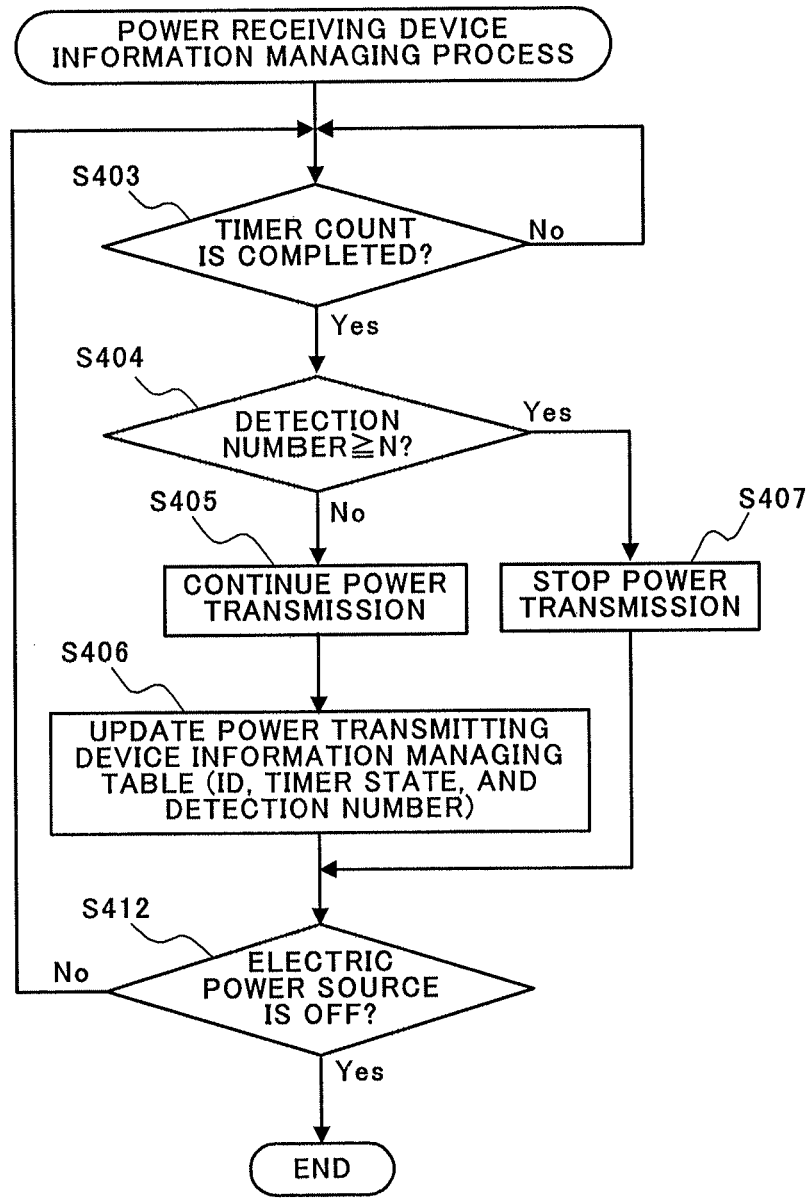
FIG. 7 is a flowchart showing a power receiving device information managing process procedure according to an embodiment 2 of the present invention.

The process contents of each step illustrated in FIG. 7 are the same as the process contents of the step that is illustrated in FIG. 4 of the embodiment 1 and to which the same reference symbol is attached. However, a process algorism (process sequence) is different. In the following, a difference in the process algorism between the embodiment 1 and the embodiment 2 is described. The detailed contents of each process step are the same as the embodiment 1, so the description is omitted.

The process algorism in the embodiment 1 illustrated in FIG. 4 and the process algorism in the embodiment 2 illustrated in FIG. 7 differ from each other in the timing when it is determined whether or not the power transmission controller 263 starts (continue) or stops the electric power transmission.

In the process algorism in the embodiment 1, each time the power transmitting device 2 newly detects the power receiving device 3, the power transmitting device 2 determines whether to start (continue) or stop the electric power transmission. Specifically, after the power receiving device finding/separation detector 261 detects the power receiving device 3 for the first time, the power transmitting device 2 counts how many times the power receiving device 3 is detected (the number of times the state is switched from the non-recognized state to the recognized state of the power receiving device 3) before the predetermined period of time lapses. Each time the power transmitting device 2 detects the power receiving device 3, the power transmitting device 2 checks whether or not the predetermined period of time lapses. The detection number determiner 266 determines whether or not the number of times of detecting the power receiving device 3 at the timing when the predetermined period of time lapses is equal to or smaller than the specified number (N number) of times. In accordance with a result of this determination, the power transmission controller 263 performs control of continuing or stopping the electric power transmission.

Meanwhile, in the process algorithm in the embodiment 2, after a predetermined period of time lapses from the time that the power transmitting device 2 detects the power receiving device 3 via the power receiving device finding/separation detector 261, the power transmitting device 2 determines whether to continue or stop the electric power transmission, via the detection number determiner 266, only once. Specifically, after the power receiving device finding/separation detector 261 detects the power receiving device 3 for the first time, the power transmitting device 2 counts how many times the power receiving device 3 is detected (the number of times the state is switched from the non-recognized state to the recognized state of the power receiving device 3) before the predetermined period of time lapses. When the predetermined period of time lapses, the detection number determiner 266 determines whether or not the number of times of detecting the power receiving device 3 at the timing of a lapse of this predetermined period of time is equal to or larger than a specified number (N number) of times. In accordance with a result of this determination, the power transmission controller 263 performs control of continuing or stopping the electric power transmission. By taking into consideration that a plurality of the devices are simultaneously charged, count of the number of times the power receiving device 3 is detected, and time count for determining whether or not the predetermined period of time lapses is performed and managed for each power receiving device 3 (ID for each power receiving device 3), in the same manner as the embodiment 1.

As described above, in the present embodiment 2, after the predetermined period of time lapses, in the case where the number of times the state is switched from the non-recognized state to the recognized state of the power receiving device 3 is equal to or larger than the specified number of times, the power transmission controller 263 stops the electric power transmission that is being performed. Thereby, it is possible to prevent generation of mismatch between the information of the power transmitting control in the power transmitting device 2 and the actual power transmitting state. In other words, it is possible to prevent user friendliness from being damaged by the mismatch between the actual state of the electric power transmission and the information that represents the charge state and that is provided to a user.

In one example, after the step S407 of FIG. 7, in the same manner as the embodiment 1, the control of causing the display 25 of the power transmitting device 2 or the display 36 of the power receiving device 3 to display one or both of the error message and the instruction for avoiding the error is performed. This process step is added after the step S407 so that a user recognizes that charge is not normally operated, leading to further improvement in user friendliness.

In one example, before the step S407, it is determined whether or not the power receiving device 3 that is being charged exists, that is, whether the number of the power receiving devices 3 is only one or plural (at the step corresponding to the step S423). In this example, the power transmission controller 263 controls the electric power transmission such that only when the power receiving device 3 that is being charged does not exist, the power transmission is stopped, and when the power receiving device 3 that is being charged exists, the power transmission is continued. Thereby, it is possible to prevent charge of one power receiving device 3 from being affected by stopping the electric power transmission due to the specific power receiving device 3 in a usage status where a plurality of the power receiving devices 3 are simultaneously charged.

Further, in the embodiment 2, in one example, when the power transmitting device 2 detects some error (for example, an extremely small received electric power amount in the power receiving device 3, or failure of normal data communication with the power receiving device 3), the power transmission controller 263 performs control so as to temporarily stop the electric power transmission and then resume the electric power transmission to restart the power receiving device 3 so that a state of the power receiving device 3 is changed to an initial state.

Embodiment 3

In the following, an embodiment 3 of the present invention is described in detail with reference to FIGS. 1, 3, 8, 9, and 10.

Figure 3:
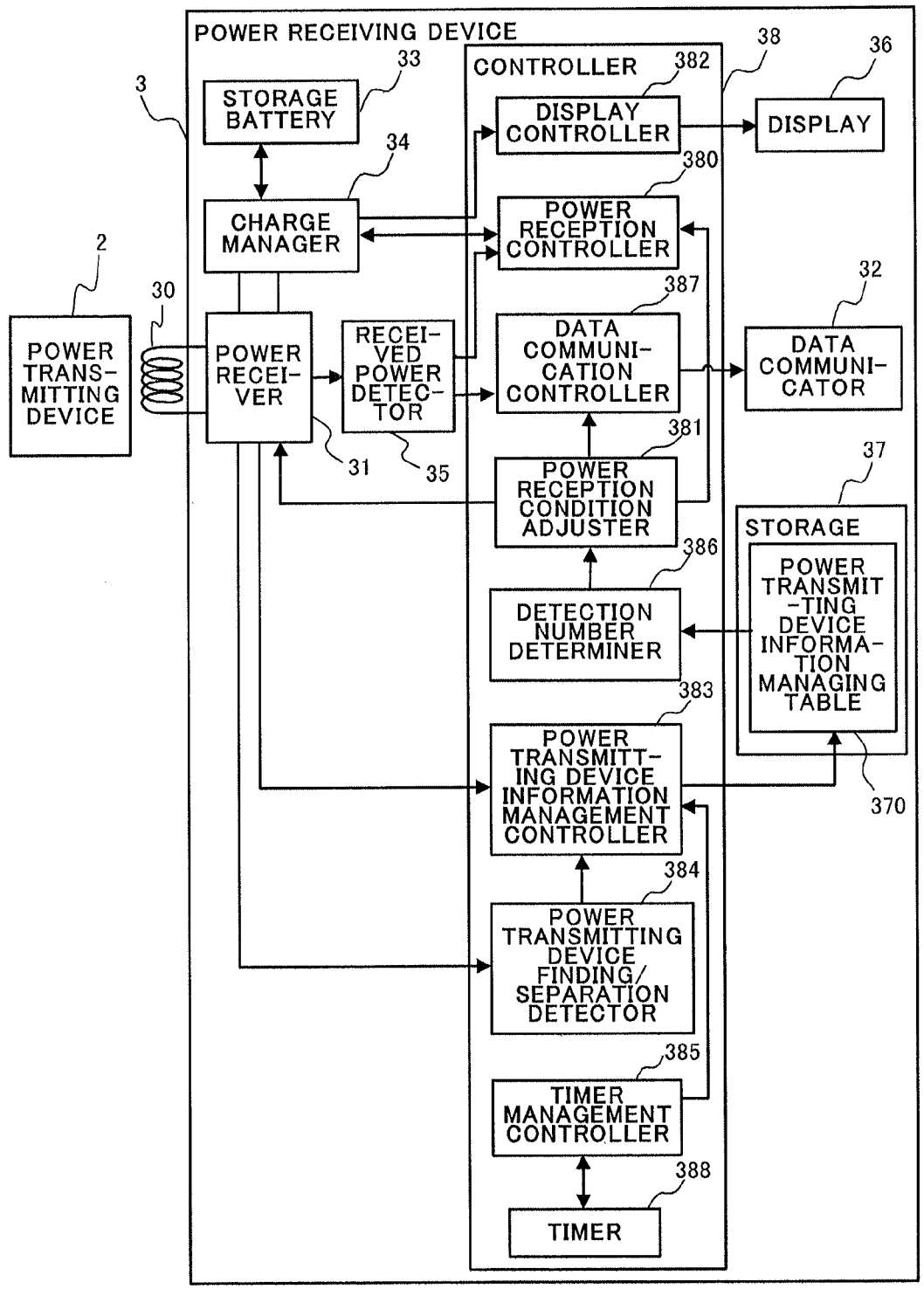
FIG. 3 is a function block diagram for describing a function of a power receiving device according to the embodiment 1.

Like the embodiment 1, the contactless electric power transmitting system 1 according to the present embodiment 3 comprises the power transmitting device 2 and the power receiving device 3 as illustrated in FIG. 3. In the embodiment 1, the power transmitting device 2 manages the power receiving device 3, and controls the electric power transmission.

Meanwhile, according to a configuration of the embodiment 3, the power receiving device 3 manages the power transmitting device 2.

The power receiving device 3 is described in detail with reference to FIG. 3. The power receiving device 3 is a portable device that needs charge of a storage battery. Examples of the power receiving device 3 include a cellular phone, a digital camera, a notebook computer, and an electric car. The power receiving device 3 possesses a function of receiving, via a secondary coil 30, the electric power transmitted from the power transmitting device 2, in a contactless manner, and charging a storage battery provided in the power receiving device 3, by the received electric power.

The power receiving device 3 comprises a power receiver 31 including the secondary coil 30, a data communicator 32, a storage battery 33, a charge manager 34, a received power detector 35, display 36, a storage 37, and a controller 38, as illustrated in FIG. 3. FIG. 3 illustrates only a function part concerning the power receiving function of the power receiving device 3, and omits other function parts such as a communicating function part of the cellular phone and an image shooting function part of the digital camera.

The power receiver 31 comprises a resonance circuit, a rectifying circuit, and a matching circuit (not illustrated in the drawing).

The resonance circuit mainly comprises the secondary coil 30 and a capacitor. The resonance circuit is configured so as to oscillate at a resonant frequency of the electric power signal output by the power transmitting device 2. In another example, the resonance circuit is configured to comprise a coil other than the secondary coil 30.

The matching circuit comprises a variable coil or a variable capacitor. The matching circuit is a circuit adjusting an inductance L or an electrostatic capacitance C of the entire power receiver 31 on the basis of information of a resonant frequency that is calculated by a power reception condition adjuster 381 (described later) of the controller 38 in accordance with a state (for example, positional relation of the respective devices, a distance between the respective devices, the number of the devices, and a charge efficiency of the power receiving device 3) between the power transmitting device 2 and the power receiving device 3 such that a power transmission efficiency becomes maximum.

The rectifying circuit rectifies an AC voltage induced from the oscillated resonance circuit to convert the AC voltage into a DC voltage, and outputs the DC voltage. The DC voltage output from the power receiver 31 is input to the storage battery 33 via the charge manager 34 so that the storage battery 33 is charged.

The data communicator 32 performs transmission and reception of data such as a control command for performing charge control with the power transmitting device 2. The transmission and the reception of the data is performed by one-way communication or two-way communication.

The storage battery 33 is a rechargeable battery. The storage battery 33 possesses a function of supplying electric power for driving each function part of the power receiving device 3. For example, the storage battery 33 is constituted by a lithium-ion battery, a nickel hydrogen battery, or the like.

The charge manager 34 monitors a DC voltage generated by the power receiver 31, a charge state of the storage battery 33, and the like, and performs control of starting and stopping charge to the storage battery 33 such that charge to the storage battery 33 is normally performed. The charge manager 34 outputs information indicating a charge state of the power receiving device 3, to a display controller 382 which will be described later.

The received power detector 35 communicates, to a power reception controller 380 of the controller 38, DC voltage information obtained from the power receiver 31.

The display 36 possesses a function of outputting visual information and audio information to provide a charge state of the power receiving device 3 to a user. For example, the display 36 is constituted by an LED, a liquid crystal display, an organic electroluminescence display, or the like, and a speaker.

The storage 37 is constituted by a nonvolatile semiconductor memory such as a read only memory (ROM) and a flash memory, or a volatile semiconductor memory such as a random access memory (RAM). The storage 37 stores a program controlling the power receiving device 3, and stores data.

The storage 24 stores a power transmitting device information managing table 370 for managing information concerning the power transmitting device 2 detected by the power receiving device 3.

Figure 10A:
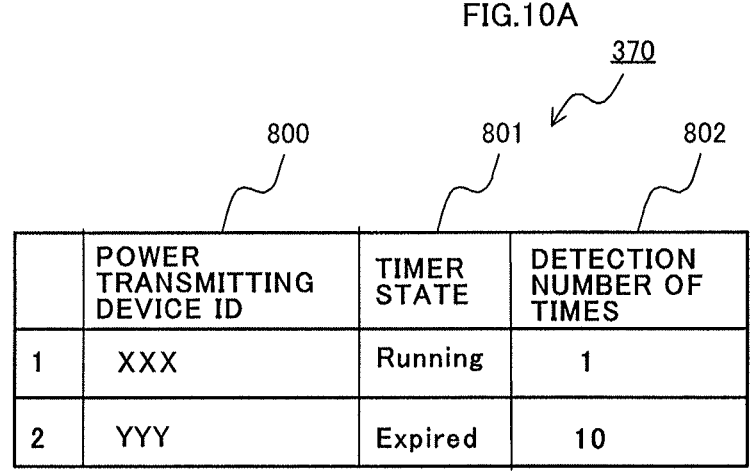
FIGS. 10A and 10B illustrate power transmitting device information managing tables according to the embodiment 3.
Figure 10B:
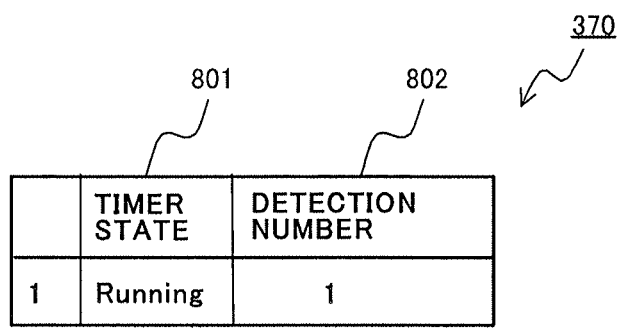

The power transmitting device information managing table 370 indicates the relation among a power transmitting device ID 800, a timer state 801, and the detection number 802, as illustrated in FIG. 10A. The power transmitting device ID 800 indicates the identification information for specifying the power transmitting device 2 detected by the power receiving device 3. When the data communicator 32 is adapted to the one-way communication, the item of the power transmitting device ID 800 does not exist, so that the table is constituted by only the timer state 801 and the detection number 802 (FIG. 10B).

The timer state 801 is information representing a state of the below-described timer 388 that is managed by the power receiving device 3 for each power transmitting device ID 800. The timer 388 is activated upon initial detection of the power transmitting device 2 by the power receiving device 3. The detection number 502 is information representing the number of times the power receiving device 3 detects the power transmitting device 2 of each power transmitting device ID 500.

The power transmitting device information managing table 370 enables management of the number-of-times information that represents how many times repeat operation of recognition and non-recognition of the power receiving device 3 is made during a predetermined period of time while the electric power transmission is being performed after the power receiving device 3 starts to receive the electric power.

The controller 38 controls an entire process including a power receiving process and a charge process in the power receiving device 3. The controller 38 comprises a power reception controller 380, a power reception condition adjuster 381, a display controller 382, a power transmitting device information management controller 383, a power transmitting device finding/separation detector 384, a timer management controller 385, a detection number determiner 386, a data communication controller 387, and a timer 388.

The controller 38 is a dedicated controller that performs electric power receiving control. Turning on the electric power source starts the operation of the controller 38. The electric power source is turned on by electromotive force that is provided from the power receiver 31 and that is generated by the electric power transmission. When the electromotive force from the power receiver 31 disappears by stop of the electric power transmission, the electric power source is turned off to end the operation. The configuration is made such that operation is performed by the electromotive force from the power receiver 31. Thereby, even when the storage battery 33 is uncharged, the charge operation is normally performed.

The power reception controller 380 obtains an after-rectified received electric power value from the power receiver 31, monitors generation of an abnormal charge state, and controls the charge manager 34 to enable the charge of the storage battery 33 to be normally performed.

The power reception condition adjuster 381 derives information indicating a transmission condition such as transmission electric power and a resonant frequency that improves an electric power transmission efficiency. The power reception condition adjuster 381 outputs the derived information to the power receiver 31 and the data communication controller 387. The matching circuit of the power receiver 31 adjusts an inductance L and an electrostatic capacitance C on the basis of the information of the input resonant frequency to enable the resonance circuit to oscillate at this resonant frequency. The data communication controller 387 makes instruction to cause the data communicator 32 to transmit, to the power transmitting device 2, a command for increasing transmission electric power.

The display controller 382 controls the display 36, and performs display control of the charge state.

The power transmitting device information management controller 383 performs addition or update of the information in the power transmitting device information managing table 370 stored in the storage 37, and management of the power transmitting device information managing table 370, on the basis of the information received by the data communicator 32 from the power transmitting device 2, and the detection result of the power transmitting device 2 from the power transmitting device finding/separation detector 384.

The power transmitting device finding/separation detector 384 possesses a function of detecting that the power receiving device 3 approaches the power transmitting device 2 within a range where it is possible for the power receiving device 3 to receive electric power, and detecting that the power receiving device 3 is separated from the range where it is possible for the power receiving device 3 to receive electric power. The power transmitting device finding/separation detector 384 determines whether or not the power transmitting device 2 approaches the range where it is possible for the power receiving device 3 to receive electric power from the power transmitting device 2. In other words, the power transmitting device finding/separation detector 384 determines whether or not there is the power transmitting device 2 of which state has been switched from a non-recognized state to a recognized state. The result of this determination is output as the detection of the power transmitting device 2 to the power transmitting device information management controller 383. As a concrete detecting method, the following methods are considered, for example. In the first method, the power receiver 31 receives an electric power signal from the power transmitting device 2 to detect approach and separation of the device. In the second method, the data communicator 32 performs, with the power transmitting device 2, transmission and reception of a control command for the charge control, and on the basis of the information received from the data communication controller 387, approach and separation of the power transmitting device 2 with respect to the power receiving device 3 is detected. A method of detecting the power transmitting device 2 is not limited to the above-described methods. In another example, approach and separation of the power transmitting device 2 is detected in a different method. The power transmitting device finding/separation detector 384 counts the number of times a state of power reception of the electric power transmission from the power transmitting device 2 is switched between the power unreceivable state and the power receivable state, so the power transmitting device finding/separation detector 384 can also be called a state switching number counter 384.

The timer management controller 385 controls and manages the timer 388.

The detection number determiner 386 receives a result indicating that the timer 388 has completed the count of the predetermined period, to read out, from the storage 37, the detection number the power transmitting device 2 is detected. This detection number is held in the power transmitting device information managing table 370. Then, the detection number determiner 386 determines whether or not the detection number during the predetermined period of time is equal to or larger than a specified number (M number) of times, and outputs a result of the determination to the power reception controller 380. The detection number determiner 386 makes the determination concerning the number of times a state is switched between the state where the power transmitting device 2 is not detected, that is, the power unreceivable state and the state where the power transmitting device 2 is detected, that is, the power receivable state, so the detection number determiner 386 can also be called a state switching number determiner 386.

The data communication controller 387 performs data communication control of the data communicator 32.

Next, operation of an electric power transmitting function by the contactless electric power transmitting system 1 configured as described above is described with reference with FIGS. 3, 7, and 8.

When the electric power source is turned on by the electromotive force of the power receiver 31 of the power receiving device 3, the power transmitting device finding/separation detector 384 of the controller 38 monitors approach of the power transmitting device 2. When the power transmitting device finding/separation detector 384 finds the power transmitting device 2 that is transmitting electric power receivable for the power receiving device 31, the oscillation circuit of the power receiver 31 oscillates at the resonant frequency of electric power outputted by the power transmitting device 2, so that the electric power transmission from the power transmitting device 2 to the power receiving device 3 is started. Then, the controller 38 outputs a control signal. By this control signal, the controller 38 controls the power reception by the power receiver 31. At this time, the data communicator 32 performs, with a data communicator 22 of the found power transmitting device 2, transmission and reception of data such as a control command for performing the electric power transmission control. The storage 37 stores information that concerns the power transmitting device 2 and that is obtained by the controller 38 on the basis of information obtained from the power receiver 31 and the data communicator 32.

Figure 8:
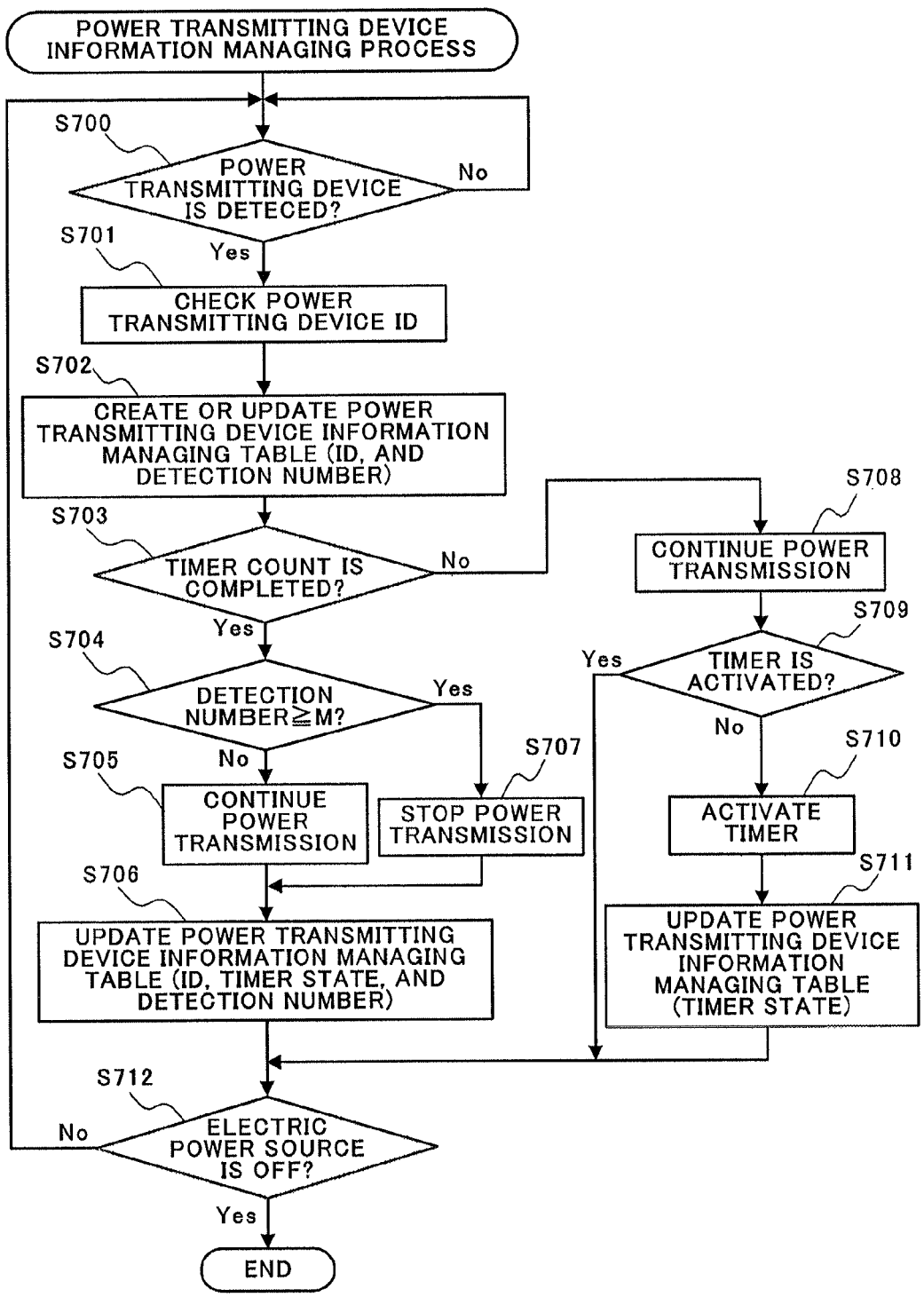
FIG. 8 is a flowchart showing a power transmitting device information managing process procedure according to an embodiment 3 of the present invention.
Figure 9:
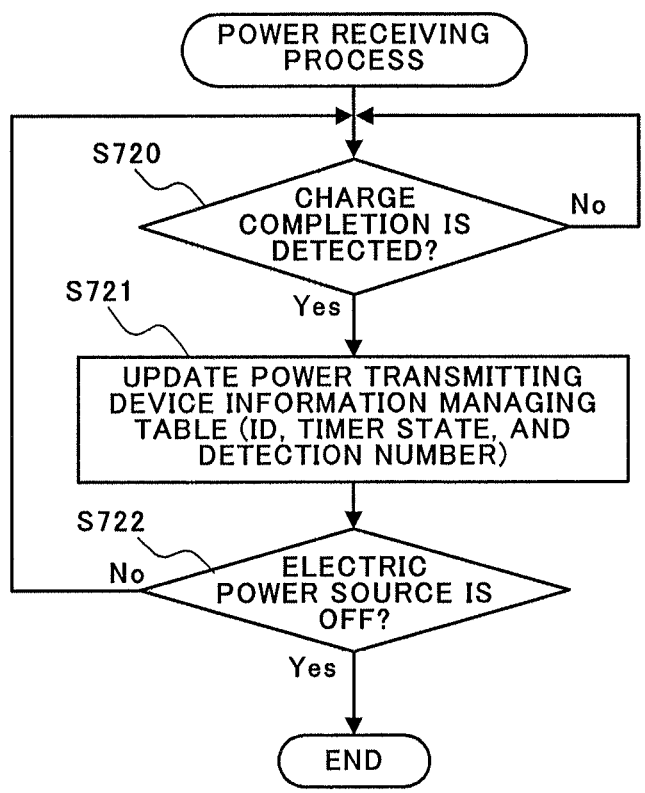
FIG. 9 is a flowchart showing a power receiving process procedure according to the embodiment 3.

Processes performed by the controller 38 of the power receiving device 3 are described in detail with reference to the flowcharts of FIGS. 8 and 9. FIG. 8 is a flowchart showing a power transmitting device information managing process, and FIG. 9 is a flowchart showing a power receiving process. Each of these processes is started by turning on the electric power source by the electromotive force from the power receiver 31. These processes are performed concurrently and independently of each other.

First, the power transmitting device information managing process illustrated in FIG. 8 will be described.

At the step S700, to detect the power transmitting device 2, the power transmitting device finding/separation detector 384 determines whether or not there is the power transmitting device 2 that has approached the power receivable range. In other words, the power transmitting device finding/separation detector 384 determines whether or not there is the power transmitting device 2 of which its state has been switched from the non-recognized state to the recognized state. When the power transmitting device finding/separation detector 384 determines the non-detection (that is, non-recognition) of the power transmitting device 2 (step S700; No), the power transmitting device finding/separation detector 384 returns the process to the step S700 to detect the power transmitting device 2 again. Meanwhile, when the power transmitting device finding/separation detector 384 determines the detection (that is, recognition) of the power transmitting device 2 (step S700; Yes), the process proceeds to the step S701.

At the step S701, the power transmitting device information management controller 383 obtains, via the data communication controller 387, the identification information (referred to as the power transmitting device ID 800, in the following) for specifying the power transmitting device 2. The power transmitting device ID 800 is obtained by the data communicator 32 through data transmission and reception between the data communicator 32 and the power transmitting device 2. The power transmitting device information management controller 383 then checks which power transmitting device 2 is detected (step S701). After the step S700, the data communication controller 387 obtains the power transmitting device ID included in a control command transmitted from the power transmitting device 2, to uniquely specify the power transmitting device 2. In a case where the electric power transmitting system 1 is not adapted to the two-way communication, and supports only the one-way communication from the power receiving device 3 to the power transmitting device 2, the power transmitting device 2 transmits no control command to the power receiving device 3, so that the process of the step S701 is omitted.

Subsequently, the power transmitting device information management controller 383 adds or updates information concerning the detected power transmitting device ID 800, in the power transmitting device information managing table 370. Specifically, when the new power transmitting device ID 800 is detected, the power transmitting device information management controller 383 adds an information section corresponding to the same power transmitting device ID 800. Meanwhile, when the power transmitting device ID 800 of which information section already exists in the power transmitting device information managing table 370 is detected, the power transmitting device information management controller 383 updates the detection number 802 corresponding to the same power transmitting device ID 800. In other words, the detection number of the power transmitting device 2 is performed and managed for each power transmitting device ID.

Then, the timer management controller 385 refers to the timer state 801 of the power transmitting device information managing table 370 to determine whether or not among the timers 388 allocated to the respective detected power transmitting devices 2, there is the timer 388 of which time count has reached the predetermined period of time, that is, the timer 388 that has completed the count (step S703). A plurality of the timers 388 provided in the power receiving device 3 are allocated to the respective detected power transmitting devices 2. The timer states 801 in the power transmitting device information managing table 370 reflect the states of the respective timers 388. The timer state 801 indicates either the state "Expired" in which the timer 388 has completed the count, or the state "Running" in which the timer 388 has not completed the count. At the step S703, if the count has not started yet by any of the timers 388, the same process as the case where it is determined that the timer 388 has not completed the count is performed (step S703; No).

When it is determined at the step S703 that there is the timer 388 that has completed the count (step S703; Yes), the detection number determiner 386 refers to the power transmitting device information managing table 370 to determine whether or not the detection number 802 corresponding to the power transmitting device ID 800 of the power transmitting device 2 for which the timer 388 has completed the count is equal to or larger than the specified number (M number) of times (step S704). When it is determined at the step S704 that the detection number 802 is smaller than the M number of times (step S704; No), the power reception controller 380 performs control so as to continue the electric power reception (step S705).

Then, the power transmitting device information management controller 383 deletes, from the power transmitting device information managing table 370, the information corresponding to the power transmitting device ID 800 of the power transmitting device 2 for which the timer 388 has completed the count, to update the power transmitting device information managing table 370 (step S706). In other words, when the number of times the same power transmitting device 2 is detected during the predetermined period of time is smaller than the predetermined number of times, it indicates that the detection state is stable, so the information concerning the power transmitting device ID 800 of the power transmitting device 2 is deleted from the power transmitting device information managing table 370 while the electric power reception is continued.

After that, it is determined that the electric power source is in an off state or not (step S712). When the electric power source is not in an off state (step S712; No), the process returns to the step S700 to continue the process.

When it is determined at the step S704 that the detection number is equal to or larger than the M number of times (step S704; Yes), the power reception controller 380 performs control of stopping the reception of the electric power (step S707). Then, the above-described process of the step S706 is performed. In other words, when the number of times the same power transmitting device 2 is detected during the predetermined period of time is larger than the predetermined number of times, it is estimated that the detection state is unstable. For this reason, the reception of the electric power is stopped, the information concerning the power reception device ID 800 of the power transmitting device 2 is deleted from the power transmitting device information managing table 370, and the detection state is monitored again.

Meanwhile, when it is determined at the step S703 that there are no timers 388 that have completed the count, or that the count has not started yet by any of the timers 388 (step S703; No), the power reception controller 380 performs control so as to continue the electric power reception (step S708).

Then, the timer management controller 385 refers to the timer state 801 in the power transmitting device information managing table 370 to determine whether or not the timer 388 corresponding to the detected power transmitting device 2 has been already activated (step S709). When it is determined that the timer 388 is not activated (step S709; No), the timer management controller 385 activates the timer 388 (at the step S710).

Then, the process proceeds to the step S711, and the power transmitting device information management controller 383 updates the timer state 801 corresponding to the power transmitting device ID 800 of the detected power transmitting device 2 (step S711). When it is determined at the step S709 that the timer 388 has been already activated (step S709;Yes), the process returns to the step S700 as long as the electric power source is not turned off (step S712; No) to continue the process.

The timer control (count of the time lapse from the timing when the power transmitting device is detected for the first time) performed at the timer management controller 385 is considered to be performed in the following methods. In the first method, a counter function of a controller provided in the power receiving device 3 is used as the timer 388. In the second method, the timer 388 functions as a clock so that the time when the power transmitting device 2 is detected for the first time is held as an initial time, and after that, each time the power transmitting device 2 is detected, a time difference from the initial time and this time point is calculated.

The time lapse from the timing when the power transmitting device 2 is detected for the first time needs to be counted precisely by taking into consideration of the case where the electric power from the power transmitting device 2 is not received, and the case where user operation causes the electric power source of the power receiving device 3 to be turned off.

When this count of the time lapse is performed by using the counter function of the controller 38 as the timer 388, the counter is continuously operated by using the storage battery 33 provided in the power receiving device 3 since the power receiving device 3 needs to operate the counter even in the period in which the power receiving device 3 does not receive the electric power from the power transmitting device 2.

When the predetermined period of time is counted by the time difference, precise time information needs to be obtained. For this reason, each time the power reception from the power transmitting device 2 is detected, the standard radio wave is obtained, or the system time of the cellular system is obtained to correct time information managed at the power receiving device 3. The information of the time when the power transmitting device 2 is detected for the first time is held by a nonvolatile memory such that the information remains even if the storage battery dies, or user operation causes the electric power source to be turned off.

By the above-described method, the time lapse from the time when the power transmitting device 2 is detected for the first time is precisely counted. This also applies to the process in the below-described embodiment 4.

Next, the power transmitting process illustrated in FIG. 9 is described. The process in FIG. 9 is performed concurrently with the above-described process in FIG. 8 so as to be continuously performed during the period in which the electric power source is made in an on state by the electromotive force from the power receiver 31.

At the step S720, on the basis of the information from the charge manager 34, the power reception controller 380 determines whether or not the charge is completed, that is, the charge completion is detected (step S720). When the charge completion is not detected (step S720; No), the process returns to the step S720. When the charge completion for the power receiving device is detected (step S720; Yes), the power transmitting device information management controller 383 deletes, from the power transmitting device information managing table 370, the information concerning the power transmitting device 2 that is a power transmitting source, to update the power transmitting device information managing table 370 (step S721).

Then, when the electric power source is not in an off state (step S722; No), the process returns to the step S720 to continue the process. In a case where the electric power transmitting system does not support the two-way communication, but supports the one-way communication, there is no discrimination for each power transmitting device ID 800.

Accordingly, all information in the table is deleted. When the electric power source is in an off state (step S722; Yes), the power receiving process is ended.

As described above, according to the embodiment 3, when the number of times the state is switched from the non-recognized state to the recognized state of the power transmitting device 2 becomes equal to or larger than the specified number of times, by the power transmitting device information management process and the power receiving process, and by the repeat operation that repeats reception and non-reception of the electric power signal or the control command from the power transmitting device 2 and that is performed at the power receiving device 3 during the predetermined period of time, the electric power reception is stopped even if the electric power signal or the control command is subsequently detected. Thereby it is possible to prevent generation of mismatch between the information of the power receiving control in the power receiving device 3 and the actual power receiving state. In other words, it is possible to prevent user friendliness from being damaged by the mismatch between the actual state of the electric power transmission and the information that represents the charge state and that is provided to a user.

In one example, after the step S707, the display controller 382 performs one or both of control of causing the display 36 to display an error message including the contents, for example, "normal start of charge fails" or "charge is stopped", and control of outputting an audio error message for recognition by a user. In this case, in an example, control of causing the display 36 to display not only the error message but also an instruction including the contents, for example, "please bring the power receiving device closer to the power transmitting device" for avoiding the error is performed, and additionally or alternatively, control of outputting an audio instruction for recognition by a user to avoid the error is performed.

In one example, the data communication controller 387 performs control of transmitting a specific command to the power transmitting device 2 via the data communicator 32 to cause the display 25 provided in the power transmitting device 2 to display one or both of the above-described error message and the above-described instruction for avoiding the error. The above-described process step is added after the step S707 so that a user recognizes that charge is not normally operated, leading to further improvement in user friendliness.

In one example, at the step S707, instead of stopping the power transmission, the power reception condition adjuster 381 makes instruction, to the matching circuit of the power receiver 31, of adjusting an inductance L and an electrostatic capacitance C to change a resonant frequency of the resonance circuit. In one example, the power reception condition adjuster 381 performs control of outputting, to the power transmission controller 380, a command for reducing a determination value used in determining whether or not to receive the electric power, or performs control of outputting, to the data communication controller 387, a command for transmitting a control command to request increase in the transmission electric power of the power transmitting device 2, or request change in the resonant frequency of the power transmitting device 2. Performing these processes suppresses generation of the phenomenon in which recognition and non-recognition of the power transmitting device 2 is repeated in the power receiving device 3.

In the embodiment 3, in one example, when the power transmitting device 2 detects some error (for example, an extremely small received electric power amount in the power receiving device 3, or failure of normal data communication with the power receiving device 3), control is performed so as to temporarily stop the electric power transmission and then resume the electric power transmission to restart the power receiving device 3 so that a state of the power receiving device 3 is changed to an initial state.

Embodiment 4

In the following, an embodiment 4 of the present invention is described in detail with reference to FIGS. 1, 3, and 11.

A configuration of the contactless electric power transmitting system 1 and an internal configuration of the power receiving device 3 according to the embodiment 4 are the same as the embodiment 3, so the description is omitted.

The present embodiment 4 differs from the embodiment 3 in the process of the controller 38 of the power receiving device 3. Accordingly, the contents of the power transmitting device information managing process of the power controller 38 are described in detail by a flowchart in FIG. 11. The power receiving process of the present embodiment is the same as the embodiment 3, so the description is omitted.

Figure 11:
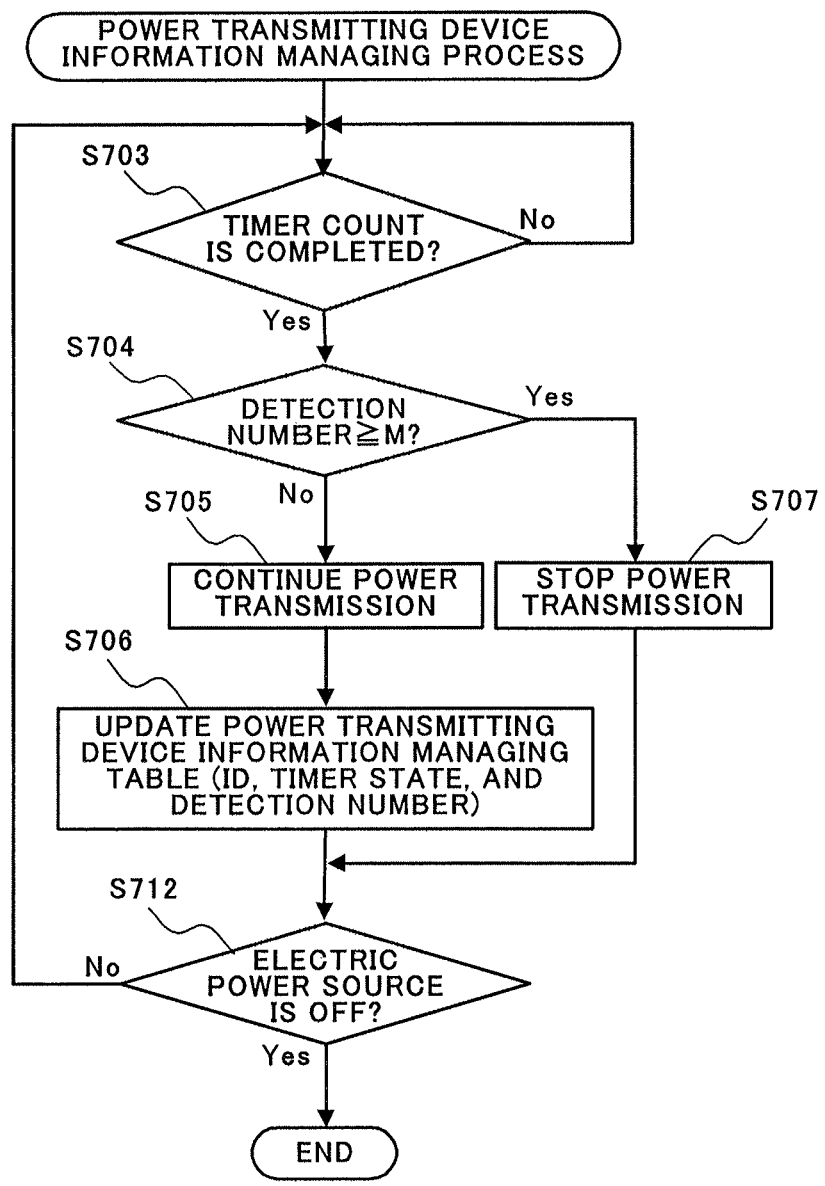
FIG. 11 is a flowchart showing a power transmitting device information managing process procedure according to an embodiment 4 of the present invention.

FIG. 11 is a flowchart showing the power transmitting device information managing process. These processes are started and performed by turning on the electric power source by the electromotive force from the power receiver 31.

The process contents of each step illustrated in FIG. 11 are the same as the process contents of the step that is illustrated in FIG. 7 of the embodiment 3 and to which the same reference symbol is attached. Only a process algorism (process sequence) is different. Accordingly, the reference symbols attached to the respective steps in FIG. 7 are used in the flowchart of FIG. 11, and in the following, a difference in the process algorism between the embodiment 3 and the embodiment 4 is described. The detailed contents of each process step are the same as the embodiment 3, so the description is omitted.

The process algorism in the embodiment 3 illustrated in FIG. 7 and the process algorism in the embodiment 4 illustrated in FIG. 11 differ from each other in the timing when it is determined whether or not the power reception controller 380 continues (starts) or stops the electric power transmission.

In the process algorism in the embodiment 3, each time the power receiving device 3 newly detects the power transmitting device 2, the power receiving device 3 determines whether to continue (or start) or stop the electric power transmission. Specifically, after the power transmitting device finding/separation detector 383 detects the power transmitting device 2 for the first time, the power receiving device 3 counts how many times the power transmitting device 2 is detected (the number of times the state is switched from the state where the recognition by the power receiving device is not made to the state where the recognition by the power receiving device is made) before the predetermined period of time lapses. Each time the power receiving device 3 detects the power transmitting device 2, the power receiving device 3 checks whether or not the predetermined period of time lapses. The detection number determiner 386 determines whether or not the number of times of detecting the power transmitting device 2 at the timing when the predetermined period of time lapses is equal to or smaller than the specified number (M number) of times. In accordance with a result of this determination, the power reception controller 380 performs control of continuing (starting) or stopping the electric power reception.

Meanwhile, in the process algorithm in the embodiment 4, after a predetermined period of time lapses from the time that the power receiving device 3 detects the power transmitting device 2, the power receiving device 3 determines whether to continue or stop the electric power reception, only once. Specifically, after the power transmitting device finding/separation detector 383 detects the power transmitting device 2 for the first time, the power receiving device 3 counts how many times the power transmitting device 2 is detected (the number of times the state is switched from the non-recognized state to the recognized state of the power receiving device 3) before the predetermined period of time lapses. When the predetermined period of time lapses, the detection number determiner 386, at this point, determines whether or not the number of times of detecting the power transmitting device 2 is equal to or larger than the specified number (M number) of times. In accordance with a result of this determination, the power reception controller 380 performs control of continuing or stopping the electric power reception. By taking into consideration that the electric power is received from a plurality of the power transmitting devices 2, count of the number of times the power transmitting device 2 is detected, and time count for determining whether or not the predetermined period of time lapses is performed and managed for each power transmitting device 2 (ID of the power transmitting device 2).

As described above, in the present embodiment 4, after the predetermined period of time lapses, in the case where the number of times the state is switched from the non-recognized state to the recognized state of the power transmitting device 2 is equal to or larger than the specified number of times, the electric power reception that is being performed is stopped. Thereby, it is possible to prevent generation of mismatch between the information of the power reception control in the power receiving device 3 and the actual power receiving state. In other words, it is possible to prevent user friendliness from being damaged by the mismatch between the actual state of the electric power reception and the information that represents the charge state and that is provided to a user.

In one example, after the step S707 in FIG. 8, in the same manner as the embodiment 3, the control of causing the display 36 of the power receiving device 3 or the display 25 of the power transmitting device 2 to display one or both of the error message and the instruction for avoiding the error is performed. In one example, control of outputting, by sound, the error message or the instruction for avoiding the error is performed. Such a process step is added after the step S707 so that a user recognizes that charge is not normally operated, leading to further improvement in user friendliness.

Further, in the present embodiment, in one example, when the power transmitting device 2 detects some error (for example, an extremely small received electric power amount in the power receiving device 3, or failure of normal data communication with the power receiving device 3), control is performed so as to temporarily stop the electric power transmission and then resume the electric power transmission to restart the power receiving device 3 so that a state of the power receiving device 3 is changed to an initial state.

As described above, according to the present invention, when the number of times a state of the power transmitting device 2 or the power receiving device 3 is switched from the non-recognized state to the recognized state during the predetermined period of time is equal to or larger than the specified number of times, the electric power transmission that is being performed is stopped. Thereby, stable electric power transmission is performed such that the information representing the electric power transmission control matches with the actual state of the electric power transmission.

The present invention is not limited to the above-described embodiments 1 to 4. Various alterations are made without departing from the gist of the present invention.

For example, in the embodiments 1 to 4, the configuration in which the power transmitting device 2 manages the power receiving device 3, or the configuration in which the power receiving device 3 manages the power transmitting device 2 is adopted. In another example, the configuration in which the power transmitting device 2 and the power receiving device 3 manage each other is adopted. The embodiment 1 or 2 and the embodiment 3 or 4 are combined to be implemented. In this case, it is possible to prevent mismatch between the electric power transmitting states respectively managed by the power transmitting device 2 and the power receiving device 3. In other words, user friendliness is prevented from being damaged by the mismatch between the actual electric power transmitting state and the information that represents the charge state and that is provided to a user.

In the above-described embodiments 1 to 4, by taking into consideration that the electric power is transmitted to a plurality of the power receiving devices 3, or that the electric power is received from a plurality of the power transmitting devices 2, the count of the number of times the power transmitting device 2 or the power receiving device 3 is detected, and time count for determining whether or not the predetermined period of time lapses is performed for each power transmitting device (power transmitting device ID) or each power receiving device 3 (power receiving device ID). However, in another example, under the condition that electric power transmission among a plurality of the power transmitting devices 2 or a plurality of the power receiving devices 3 is not considered, and all of a plurality of the power transmitting devices 2 or all of a plurality of the power receiving devices 3 are regarded as the same device, the count of the detection number, or the time count for determining whether or not the predetermined period of time lapses is performed and managed. In this manner, the process is simplified.

In the above-described embodiments 1 to 4, on the basis of the number of times the state of the power transmitting device 2 or the power receiving device 3 is switched from the non-recognized state to the recognized state, the electric power transmission is controlled. However, in another example, the number of times the state is switched from the recognized state to the non-recognized state is counted, and on the basis of this counted number of times, the electric power transmission is controlled.

In the above-described embodiments 3 and 4, the controller 38 is a dedicated controller that performs control of the electric power reception. However, in another example, the controller that is standardized with a controller performing other functions (a communication function of a cellular phone, an image shooting function of a digital camera, and the like) of the power receiving device 3 is used. In this case, the operation of the controller 38 illustrated in FIGS. 7 and 9 is started when the electric power source is turned on by the electromotive force from the storage battery 33, and this operation of the controller 38 is ended when the electric power source is turned off.

Programs of the processes performed by the controllers 26 and 38 of the above-described embodiments 1 to 4 are applied to existing battery chargers, information terminals, and the like. Thereby, these battery chargers, information terminals, and the like function as the power transmitting device 2 or the power receiving device 3 according to the present invention.

A method of distributing these programs is arbitrary. For example, the programs are distributed in a state where the programs are stored in a computer readable non-transitory recording media such as compact disk read-only memories (CD-ROM), digital versatile disks (DVD), magneto optical disks, and memory cards. Alternatively, the programs are distributed via a communication network such as a cellular phone network and the Internet.

A part of or all of the above-described embodiments 1 to 4 are described as the following remarks. However, the present invention is not limited to the following.

(Remark 1)

A power transmitting device comprising:

a power transmitter that transmits electric power in a contactless manner;

a data communicator that obtains identification information of one or more power receiving devices that have become possible to receive electric power transmitted from the power transmitter;

a state switching number counter that counts the number of state switchings between a power unreceivable state and a power receivable state during a predetermined period of time, for each power receiving device of which the identification information has been obtained; and a power transmission controller that controls electric power transmission performed by the power transmitter, on the basis of the number of state switchings, the number of state switchings being counted by the state switching number counter.

(Remark 2)

The power transmitting device according to the Remark 1 further comprising a state switching number determiner that determines whether or not the number of state switchings counted by the state switching number counter is equal to or greater than a predetermined value;

wherein after a state of at least one of the power receiving devices become the power receivable state, the power transmission controller starts electric power transmission by the power transmitter; when the state switching number determiner determines that the number of state switchings is smaller than the predetermined value, the power transmission controller continues the electric power transmission; and when the state switching number determiner determines that the number of state switchings is equal to or greater than the predetermined value, the power transmission controller performs one of control of increasing electric power transmitted, control of changing a resonant frequency of the power transmitter, and control of stopping the electric power transmission.

(Remark 3)

The power transmitting device according to the Remark 1 or 2 further comprising one or more timers respectively associated with the one or more power receiving devices of which the identification information are obtained;

wherein each of the timers counts time from the time when a state of corresponding power receiving device becomes the power receivable state, to detect a lapse of the predetermined period of time, and the state switching number counter counts the number of state switchings during the predetermined period of time detected by the timer, for each of the power receiving devices of which the identification information has been obtained.

(Remark 4)

A power receiving device comprising:

a power receiver that receives electric power transmitted from a power transmitting device in a contactless manner;

a data communicator that obtains identification information of one or more power transmitting devices from the power transmitting device that transmits the electric power, wherein the power receiver has become possible to receive the electric power;

a state switching number counter that counts a number of state switchings of a power receiving state between a power unreceivable state and a power receivable state during a predetermined period of time, wherein the power receiving state concerns electric power transmission from the power transmitting device of which identification information has been obtained; and a power reception controller that controls electric power reception performed by the power receiver, on the basis of the number of state switchings, the number of state switchings being counted by the state switching number counter.

(Remark 5)

The power receiving device according to the Remark 4 further comprising a state switching number determiner that determines whether or not the number of state switchings counted by the state switching number counter is equal to or greater than a predetermined value;

wherein when the state switching number determiner determines that the number of state switchings is smaller than the predetermined value, the power reception controller continues the electric power reception; and when the state switching number determiner determines that the number of state switchings is equal to or greater than the predetermined value, the power reception controller performs a control of stopping the electric power reception.

(Remark 6)

The power receiving device according to the Remark 5, wherein the data communicator is capable of transmitting another signal to the power transmitting device, and when the state switching number determiner determines that the number of state switchings is equal to or greater than the predetermined value, the power reception controller performs one of a control of increasing electric power transmitted by the power transmitting device, a control of changing a resonant frequency of a power transmitting circuit of the power transmitting device, and a control of transmitting, via the data communicator, to the power transmitting device, a signal for making instruction that causes the power transmitting device to stop the electric power transmission performed by the power transmitting device, instead of performing the control of stopping the electric power reception.

(Remark 7)

The power receiving device according to any one of the Remarks 4 to 6 further comprising one or more timers respectively associated with the one or more power transmitting devices of which identification information are obtained;

wherein each of the timers counts time from the time when reception of electric power from corresponding power transmitting device is enabled, to detect a lapse of the predetermined period of time, and the state switching number counter counts the number of state switchings during the predetermined period of time detected by the timer, for each of the power transmitting devices of which identification information have been obtained.

(Remark 8)

A contactless electric power transmitting system comprising a power transmitting device and a power receiving device, and transmitting electric power from the power transmitting device to the power receiving device in a contactless manner, wherein at least either the power transmitting device or the power receiving device comprises:

a data communicator that obtains identification information of the power transmitting device or the power receiving device that is the other side of electric power transmission, and with which the electric power transmission has been enabled;

a state switching number counter that counts a number of state switchings between an electric power transmission disabled state and an electric power transmission enabled state during a predetermined period of time, for the power transmitting device or the power receiving device of which identification information has been obtained; and a controller that controls the electric power transmission on the basis of the number of state switchings, the number of state switchings being counted by the state switching number counter.

(Remark 9)

A contactless electric power transmission controlling method for electric power transmission from a power transmitting device to a power receiving device in a contactless manner, the method being performed in at least either the power transmitting device or the power receiving device, and comprising:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which identification information has been obtained; and a controlling step that controls the electric power transmission on the basis of the number of state switchings, the number of state switchings being counted at the state switching number counting step.

(Remark 10)

A computer readable non-transitory recording medium that stores a program causing a computer, to perform, that controls a power transmitting device in a contactless electric power transmitting system, in which the power transmitting device transmits electric power to a power receiving device:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which identification information has been obtained; and a controlling step that controls the electric power transmission on the basis of the number of state switchings, the number of state switchings being counted at the state switching number counting step.

(Remark 11)

A computer readable non-transitory recording medium that stores a program causing a computer, to execute, that controls a power receiving device in a contactless electric power transmitting system in which a power transmitting device transmits electric power to the power receiving device:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which identification information has been obtained; and a controlling step that controls the electric power transmission on the basis of the number of state switchings, the number of state switchings being counted at the state switching number counting step.

The present application claims priority based on the Japanese patent application No. 2011-090692 that was filed with Japanese Patent Office on Apr. 15, 2011 and that includes the specification, claims, drawings, and abstract. The entire contents disclosed in this original patent application are incorporated by reference in the present application.

REFERENCE SIGNS LIST

1 Contactless electric power transmitting system
2 Power transmitting device
3 Power receiving device
20 Primary coil
30 Secondary coil
21 Power transmitter
22 Data communicator
23 Electric power supply
24 Storage
25 Display
26 Controller
31 Power receiver
32 Data communicator
33 Battery
34 Charge manager
35 Received power detector
36 Display
37 Storage
38 Controller
240 Power receiving device information managing table
260 Timer management controller
261 Power receiving device finding/separation detector (state switching number counter)
262 Power receiving device information management controller
263 Power transmission controller
264 Power transmission condition adjuster
265 Display controller
266 Detection number determiner (state switching number determiner)
267 Data communication controller
268 Timer
370 Power transmitting device information managing table
380 Power reception controller
381 Power reception condition adjuster
382 Display controller
383 Power transmitting device information management controller
384 Power transmitting device finding/separation detector (state switching number counter)
385 Timer management controller
386 Detection number determiner (state switching number determiner)
387 Data communication controller
388 Timer

The invention claimed is:

1. A power transmitting device comprising:
a power transmitter that transmits electric power in a contactless manner;
a data communicator that obtains identification information of one or more power receiving devices that have become possible to receive electric power transmitted from the power transmitter;
a state switching number counter that counts a number of state switchings between a power unreceivable state and a power receivable state during a predetermined period of time, for each power receiving device of which the identification information has been obtained; and
a power transmission controller that controls electric power transmission performed by the power transmitter, on the basis of the number of state switchings, the number of state switchings being counted by the state switching number counter.

2. The power transmitting device according to claim 1 further comprising a state switching number determiner that determines whether or not the number of state switchings counted by the state switching number counter is equal to or greater than a predetermined value;
wherein after a state of at least one of the power receiving devices become the power receivable state, the power transmission controller starts electric power transmission by the power transmitter; when the state switching number determiner determines that the number of state switchings is smaller than the predetermined value, the power transmission controller continues the electric power transmission; and when the state switching number determiner determines that the number of state switchings is equal to or greater than the predetermined value, the power transmission controller performs one of control of increasing electric power transmitted, control of changing a resonant frequency of the power transmitter, and control of stopping the electric power transmission.

3. The power transmitting device according to claim 1 further comprising one or more timers respectively associated with the one or more power receiving devices of which the identification information are obtained;
wherein each of the timers counts time from the time when a state of corresponding power receiving device becomes the power receivable state, to detect a lapse of the predetermined period of time, and
the state switching number counter counts the number of state switchings during the predetermined period of time detected by the timer, for each of the power receiving devices of which the identification information has been obtained.

4. A power receiving device comprising:
a power receiver that receives electric power transmitted from a power transmitting device in a contactless manner;
a data communicator that obtains identification information of one or more power transmitting devices from the power transmitting device that transmits the electric power, wherein the power receiver has become possible to receive the electric power;
a state switching number counter that counts a number of state switchings of a power receiving state between a power unreceivable state and a power receivable state during a predetermined period of time, wherein the power receiving state concerns electric power transmission from the power transmitting device of which identification information has been obtained; and
a power reception controller that controls electric power reception performed by the power receiver, on the basis of the number of state switchings, the number of state switchings being counted by the state switching number counter.

5. The power receiving device according to claim 4, further comprising a state switching number determiner that determines whether or not the number of state switchings counted by the state switching number counter is equal to or greater than a predetermined value;

wherein when the state switching number determiner determines that the number of state switchings is smaller than the predetermined value, the power reception controller continues the electric power reception; and when the state switching number determiner determines that the number of state switchings is equal to or greater than the predetermined value, the power reception controller performs a control of stopping the electric power reception.

6. The power receiving device according to claim 5, wherein the data communicator is capable of transmitting another signal to the power transmitting device, and when the state switching number determiner determines that the number of state switchings is equal to or greater than the predetermined value, the power reception controller performs one of a control of increasing electric power transmitted by the power transmitting device, a control of changing a resonant frequency of a power transmitting circuit of the power transmitting device, and a control of transmitting, via the data communicator, to the power transmitting device, a signal for making instruction that causes the power transmitting device to stop the electric power transmission performed by the power transmitting device, instead of performing the control of stopping the electric power reception.

7. The power receiving device according to claim 4, further comprising one or more timers respectively associated with the one or more power transmitting devices of which identification information are obtained;

wherein each of the timers counts time from the time when reception of electric power from corresponding power transmitting device is enabled, to detect a lapse of the predetermined period of time, and the state switching number counter counts the number of state switchings during the predetermined period of time detected by the timer, for each of the power transmitting devices of which identification information have been obtained.

8. A contactless electric power transmission controlling method for electric power transmission from a power transmitting device to a power receiving device in a contactless manner, the method being performed in at least either the power transmitting device or the power receiving device, and comprising:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which identification information has been obtained; and a controlling step that controls the electric power transmission on the basis of the number of state switchings, the number of state switchings being counted at the state switching number counting step.

9. A computer readable non-transitory recording medium that stores a program causing a computer, to execute, that controls a power transmitting device in a contactless electric power transmitting system, in which the power transmitting device transmits electric power to a power receiving device:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time, for the power transmitting device or the power receiving device of which identification information has been obtained; and a controlling step that controls the electric power transmission on the basis of the number of state switchings, the number of state switchings being counted at the state switching number counting step.

10. A computer readable non-transitory recording medium that stores a program causing a computer, to execute, that controls a power receiving device in a contactless electric power transmitting system in which a power transmitting device transmits electric power to the power receiving device:

an identification information obtaining step that obtains identification information of the power transmitting device or the power receiving device that is the other side of electric power transmission, and with which the electric power transmission has been enabled;

a state switching number counting step that counts a number of state switchings between an electric power transmission disabled state and an electric power transmission enabled state during a predetermined period of time for the power transmitting device or the power receiving device of which identification information has been obtained; and a controlling step that controls the electric power transmission on the basis of the number of state switchings, the number of state switchings being counted at the state switching number counting step.

\* \* \* \* \*